US011682032B2

(12) United States Patent
Sheppard et al.

(10) Patent No.: US 11,682,032 B2
(45) Date of Patent: *Jun. 20, 2023

(54) METHODS AND APPARATUS TO ESTIMATE POPULATION REACH FROM DIFFERENT MARGINAL RATINGS AND/OR UNIONS OF MARGINAL RATINGS BASED ON IMPRESSION DATA

(71) Applicant: The Nielsen Company (US), LLC, New York, NY (US)

(72) Inventors: Michael Sheppard, Holland, MI (US); Ludo Daemen, Duffel (BE); Jonathan Sullivan, Hurricane, UT (US); Michael D. Morgan, Bartlett, IL (US); Edward Murphy, North Stonington, CT (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/567,710

(22) Filed: Jan. 3, 2022

(65) Prior Publication Data

US 2022/0122104 A1 Apr. 21, 2022

Related U.S. Application Data

(63) Continuation of application No. 16/355,386, filed on Mar. 15, 2019, now Pat. No. 11,216,834.

(51) Int. Cl.
*G06Q 30/0204* (2023.01)
*G06F 7/544* (2006.01)
(Continued)

(52) U.S. Cl.
CPC ........... *G06Q 30/0204* (2013.01); *G06F 7/53* (2013.01); *G06F 7/544* (2013.01); *H04L 67/54* (2022.05)

(58) Field of Classification Search
CPC .......... G06Q 10/00–50/00; G06F 1/00–40/00; H04L 1/00–69/00
(Continued)

(56) References Cited

U.S. PATENT DOCUMENTS 5,956,692 A 9/1999 Foley
6,108,637 A 8/2000 Blumenau
(Continued)

FOREIGN PATENT DOCUMENTS

JP 2015529870 10/2015
KR 20160087263 7/2016
(Continued)

OTHER PUBLICATIONS

Huckett et al., "Combining Methods to Create Synthetic Microdata: Quantile Regression, Hot Deck, and Rank Swapping," Research Gate, Apr. 2008, 11 pages.
(Continued)

*Primary Examiner* — Alan S Miller
(74) *Attorney, Agent, or Firm* — Hanley, Flight & Zimmerman, LLC

(57) ABSTRACT

Example methods, apparatus, and articles of manufacture are disclosed to estimate population reach. An example apparatus includes processor circuitry to determine first multipliers corresponding to a panelist impression count and panelist audience size totals of at least one of a first margin of media, a second margin of the media, or a union of the first margin and the second margin, the first margin, the second margin, and the union included in a tree association; concurrently determine second multipliers using the tree association and the first multipliers; determine third multipliers corresponding to a total audience size exposed to the media at at least one of the first margin, the second margin, or the union based on the tree association using database
(Continued)

proprietor impression totals; and determine, based on the third multipliers, an estimate for the population reach of the media for at least one of the first margin, the second margin, or the union.

20 Claims, 8 Drawing Sheets

(51) Int. Cl.
    *G06F 7/53* (2006.01)
    *H04L 67/54* (2022.01)
(58) Field of Classification Search
    USPC .............................................. 705/7.11–7.42
    See application file for complete search history.

(56) References Cited

U.S. PATENT DOCUMENTS

| | | | |
|---|---|---|---|
| 6,460,025 B1 | 10/2002 | Fohn | |
| 6,775,663 B1 | 8/2004 | Kim | |
| 7,197,472 B2 | 3/2007 | Conkwright | |
| 7,746,272 B2 | 6/2010 | Vollath | |
| 7,865,916 B2* | 1/2011 | Beser | G06F 21/10 |
| | | | 705/14.69 |
| 7,954,120 B2 | 5/2011 | Roberts | |
| 8,087,041 B2 | 12/2011 | Fu | |
| 8,112,301 B2 | 2/2012 | Harvey | |
| 8,149,162 B1 | 4/2012 | Pauls | |
| 8,171,032 B2 | 5/2012 | Herz | |
| 8,185,456 B2 | 5/2012 | LeClair | |
| 8,200,693 B2 | 6/2012 | Steele | |
| 8,370,489 B2 | 2/2013 | Mazumdar | |
| 8,423,406 B2 | 4/2013 | Briggs | |
| 8,453,173 B1 | 5/2013 | Anderson | |
| 8,619,892 B2 | 12/2013 | Vetter | |
| 8,874,652 B1 | 10/2014 | Pecjak | |
| 8,930,701 B2 | 1/2015 | Burbank | |
| 8,973,023 B1* | 3/2015 | Rao | G06Q 30/0242 |
| | | | 705/14.44 |
| 9,070,139 B2 | 6/2015 | Zhang | |
| 9,111,186 B2 | 8/2015 | Blasinski | |
| 9,224,094 B2 | 12/2015 | Oliver | |
| 9,236,962 B2* | 1/2016 | Hawkins | H04N 7/16 |
| 9,237,138 B2 | 1/2016 | Bosworth | |
| 9,420,320 B2 | 8/2016 | Doe | |
| 9,529,836 B1 | 12/2016 | Hale | |
| 10,045,057 B2* | 8/2018 | Shah | H04H 60/66 |
| 10,070,166 B2 | 9/2018 | Chaar | |
| 10,313,752 B2 | 6/2019 | Nagaraja Rao | |
| 10,491,696 B2 | 11/2019 | Gierada | |
| 10,602,224 B2 | 3/2020 | Sullivan | |
| 10,728,614 B2 | 7/2020 | Sheppard | |
| 10,743,064 B2 | 8/2020 | Berezowski | |
| 10,856,027 B2 | 12/2020 | Sheppard | |
| 11,115,710 B2 | 9/2021 | Sheppard | |
| 11,140,449 B2 | 10/2021 | Sullivan | |
| 11,216,834 B2 | 1/2022 | Sheppard | |
| 11,323,772 B2 | 5/2022 | Sheppard | |
| 11,425,458 B2 | 8/2022 | Sheppard | |
| 11,438,662 B2 | 9/2022 | Sullivan | |
| 11,483,606 B2 | 10/2022 | Sheppard | |
| 11,523,177 B2 | 12/2022 | Sheppard | |
| 11,553,226 B2 | 1/2023 | Sheppard | |
| 2002/0123928 A1 | 9/2002 | Eldering | |
| 2003/0037041 A1 | 2/2003 | Hertz | |
| 2004/0001538 A1 | 1/2004 | Garrett | |
| 2004/0059549 A1 | 3/2004 | Kropaczek | |
| 2006/0190318 A1 | 8/2006 | Downey | |
| 2007/0087756 A1* | 4/2007 | Hoffberg | G06Q 30/08 |
| | | | 455/450 |
| 2008/0028006 A1 | 1/2008 | Liu | |
| 2008/0228543 A1 | 9/2008 | Doe | |
| 2008/0300965 A1 | 12/2008 | Doe | |
| 2008/0313017 A1 | 12/2008 | Totten | |
| 2010/0161385 A1 | 6/2010 | Karypis | |
| 2010/0191723 A1 | 7/2010 | Perez | |
| 2011/0196733 A1* | 8/2011 | Li | G06Q 30/02 |
| | | | 705/14.42 |
| 2012/0023522 A1 | 1/2012 | Anderson | |
| 2012/0052930 A1 | 3/2012 | McGucken | |
| 2012/0066410 A1 | 3/2012 | Stefanakis | |
| 2012/0072940 A1 | 3/2012 | Fuhrer | |
| 2012/0110027 A1 | 5/2012 | Falcon | |
| 2012/0254911 A1 | 10/2012 | Doe | |
| 2013/0138743 A1* | 5/2013 | Amento | G06Q 30/0204 |
| | | | 709/204 |
| 2013/0198125 A1 | 8/2013 | Oliver | |
| 2013/0254787 A1 | 9/2013 | Cox | |
| 2013/0290233 A1 | 10/2013 | Ferren | |
| 2013/0339991 A1 | 12/2013 | Ricci | |
| 2013/0346033 A1 | 12/2013 | Wang | |
| 2014/0101685 A1 | 4/2014 | Kitts | |
| 2014/0112557 A1 | 4/2014 | Santamaria-Pang | |
| 2014/0278933 A1 | 9/2014 | McMillan | |
| 2014/0280891 A1 | 9/2014 | Doe | |
| 2014/0337104 A1* | 11/2014 | Splaine | G06Q 30/0204 |
| | | | 705/7.33 |
| 2014/0358676 A1 | 12/2014 | Srivastava | |
| 2015/0032310 A1 | 1/2015 | Zettel | |
| 2015/0180989 A1* | 6/2015 | Seth | G06Q 30/0277 |
| | | | 709/224 |
| 2015/0186403 A1* | 7/2015 | Srivastava | H04N 21/44226 |
| | | | 707/692 |
| 2015/0193813 A1 | 7/2015 | Toupet | |
| 2015/0332310 A1 | 11/2015 | Cui | |
| 2015/0332317 A1 | 11/2015 | Cui | |
| 2016/0012314 A1 | 1/2016 | Ramamurthy | |
| 2016/0086208 A1 | 3/2016 | Oliver | |
| 2016/0134934 A1 | 5/2016 | Jared | |
| 2016/0162955 A1* | 6/2016 | O'Kelley | G06Q 30/0277 |
| | | | 705/14.71 |
| 2016/0165277 A1 | 6/2016 | Kirillov | |
| 2016/0232563 A1 | 8/2016 | Perez | |
| 2016/0249098 A1 | 8/2016 | Pecjak | |
| 2016/0269783 A1* | 9/2016 | Mowrer | H04N 21/44222 |
| 2016/0323616 A1 | 11/2016 | Doe | |
| 2016/0373820 A1 | 12/2016 | Meyer | |
| 2016/0379246 A1 | 12/2016 | Sheppard | |
| 2017/0006342 A1 | 1/2017 | Nagaraja Rao | |
| 2017/0034594 A1 | 2/2017 | Francis | |
| 2017/0155956 A1 | 6/2017 | Nagaraja Rao | |
| 2017/0187478 A1* | 6/2017 | Shah | H04N 21/8456 |
| 2017/0213243 A1* | 7/2017 | Dollard | G06Q 30/0249 |
| 2017/0300911 A1 | 10/2017 | Alnajem | |
| 2018/0073933 A1 | 3/2018 | Keskin | |
| 2018/0225709 A1 | 8/2018 | Ferber | |
| 2018/0249208 A1 | 8/2018 | Sheppard | |
| 2018/0249210 A1 | 8/2018 | Sheppard | |
| 2018/0249211 A1 | 8/2018 | Sheppard | |
| 2018/0249214 A1 | 8/2018 | Sullivan | |
| 2018/0376198 A1 | 12/2018 | Sheppard | |
| 2019/0147461 A1 | 5/2019 | Sheppard | |
| 2019/0289363 A1 | 9/2019 | Nagaraja Rao | |
| 2019/0354574 A1 | 11/2019 | Wick | |
| 2019/0356950 A1 | 11/2019 | Sheppard | |
| 2019/0370860 A1 | 12/2019 | Morovati Lopez | |
| 2020/0120387 A1 | 4/2020 | Sheppard | |
| 2020/0175546 A1 | 6/2020 | Perez | |
| 2020/0204863 A1 | 6/2020 | Sullivan | |
| 2020/0294069 A1 | 9/2020 | Sheppard | |
| 2020/0296441 A1 | 9/2020 | Sheppard | |
| 2020/0359090 A1 | 11/2020 | Sheppard | |
| 2021/0014564 A1 | 1/2021 | Sheppard | |
| 2021/0058659 A1 | 2/2021 | Sheppard | |
| 2021/0065230 A1 | 3/2021 | Flynn | |
| 2021/0133773 A1 | 5/2021 | Sheppard | |
| 2021/0158377 A1 | 5/2021 | Sheppard | |
| 2021/0319002 A1 | 10/2021 | Ryan | |
| 2021/0319474 A1 | 10/2021 | Sheppard | |
| 2021/0400341 A1 | 12/2021 | Sheppard | |
| 2022/0038781 A1 | 2/2022 | Sullivan | |
| 2022/0058667 A1 | 2/2022 | Sheppard | |

(56) References Cited

U.S. PATENT DOCUMENTS

| | | |
|---|---|---|
| 2022/0058688 A1 | 2/2022 | Sheppard |
| 2022/0159326 A1 | 5/2022 | Sheppard |
| 2022/0264179 A1 | 8/2022 | Sheppard |
| 2022/0264187 A1 | 8/2022 | Sheppard |
| 2022/0408154 A1 | 12/2022 | Sheppard |

FOREIGN PATENT DOCUMENTS

| | | |
|---|---|---|
| WO | 2008127737 | 10/2008 |
| WO | 2014210597 | 12/2014 |

OTHER PUBLICATIONS

Golub et al., "Linear Least Squares and Quadratic Programming," Technical Report No. CS 134, Stanford University, Computer Science Department, May 1969, 38 pages.

Charles L. Byrne, "Iterative Algorithms in Inverse Problems," Apr. 25, 2006, 347 pages.

Charles L. Byrne, "Applied Iterative Methods," Jan. 23, 2007, 396 pages.

Bourguignon et al., "On the Construction of Synthetic Panels," Oct. 2015, 42 pages.

Marno Verbeek, "Pseudo-Panels and Repeated Cross-Sections," The Econometrics of Panel Data, Springer-Verlag Berlin Heidelberg 2008, 15 pages.

P.J.G. Teunissen, "Least-Squares Estimation of the Integer GPS Ambiguities," Delft University of Technology, Department of the Geodetic Engineering, Aug. 1993, 16 pages.

United States Patent and Trademark Office, "Non-Final Office action" issued in connection with U.S. Appl. No. 15/445,530, dated Apr. 11, 2018, 10 pages.

United States Patent and Trademark Office, "Notice of Allowance," issued in connection with U.S. Appl. No. 15/445,530, dated Jan. 2, 2019, 7 pages.

United States Patent and Trademark Office, "Notice of Allowance," issued in connection with U.S. Appl. No. 15/445,530, dated May 3, 2019, 5 pages.

United States Patent and Trademark Office, "Notice of Allowability," issued in connection with U.S. Appl. No. 15/445,530, dated May 21, 2019, 2 pages.

Haggin, Patience et al., "Google Nears a Long-Tipped Limit on Tracking "Cookies," in Blow to Rivals," The Wall Street Journal, May 6, 2019, obtained from https://www.wsj.com/articles/googles-new-privacy-tools-to-make-cookies-crumble-competitors-stumble-11557151913, 3 pages.

International Searching Authority. "International Search Report & Written Opinion", issued in connection with application No. PCT/US2020/022438 dated Jul. 6, 2020, 10 pages.

United States Patent and Trademark Office, "Non-Final Office Action," issued in connection with U.S. Appl. No. 16/893,129, dated Apr. 13, 2021, 8 pages.

United States Patent and Trademark Office, "Notice of Allowance," issued in connection with U.S. Appl. No. 16/893,129, dated Jul. 29, 2021, 5 pages.

International Searching Authority. "International Preliminary Report on Patentability", issued in connection with application No. PCT/US2020/022438 dated Sep. 16, 2021, 6 pages.

International Searching Authority. "International Preliminary Report on Patentability", issued in connection with application No. PCT/US2020/022436 dated Sep. 16, 2021, 5 pages.

United States Patent and Trademark Office, "Notice of Allowance," issued in connection with U.S. Appl. No. 16/893,129, dated Dec. 14, 2021, 5 pages.

United States Patent and Trademark Office, "Corrected Notice of Allowability," issued in connection with U.S. Appl. No. 16/893,129, dated Dec. 22, 2021, 2 pages.

United States Patent and Trademark Office, "Corrected Notice of Allowability," issued in connection with U.S. Appl. No. 16/893,129, dated Apr. 8, 2022, 2 pages.

United States Patent and Trademark Office, "Non-Final Office Action," issued in connection with U.S. Appl. No. 17/734,792, dated Oct. 13, 2022, 6 pages.

\* cited by examiner

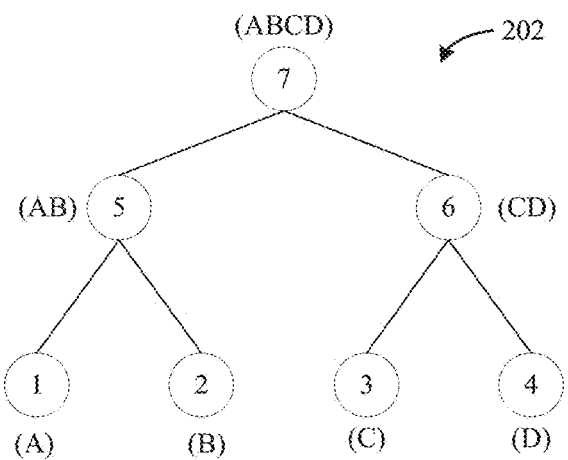
FIG. 2A
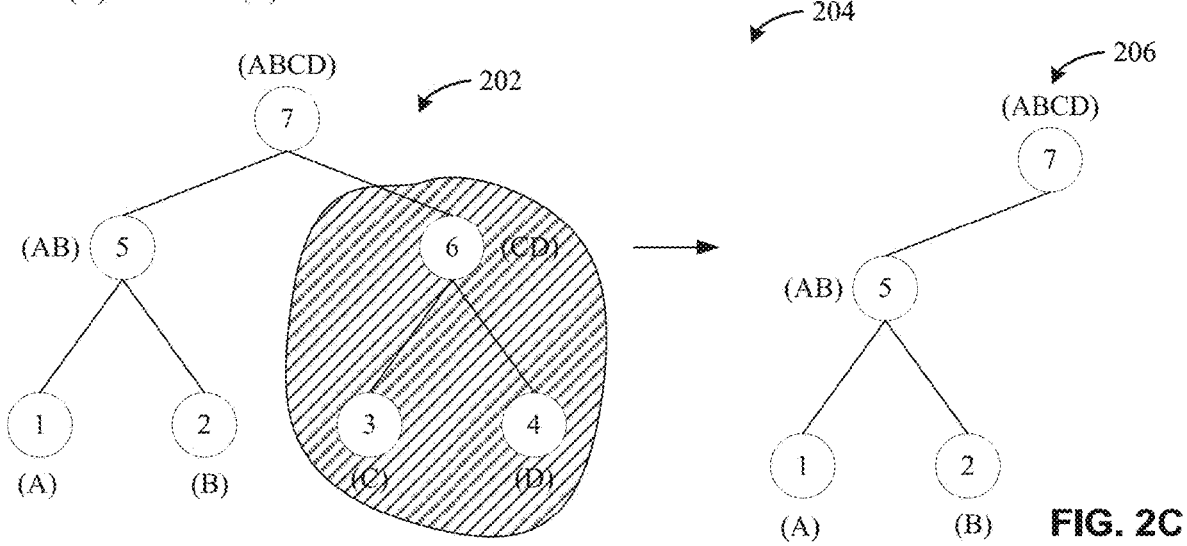
FIG. 2B
FIG. 2C

US 11,682,032 B2

METHODS AND APPARATUS TO ESTIMATE POPULATION REACH FROM DIFFERENT MARGINAL RATINGS AND/OR UNIONS OF MARGINAL RATINGS BASED ON IMPRESSION DATA

RELATED APPLICATION

This patent arises from a continuation of U.S. patent application Ser. No. 16/355,386, (now U.S. Pat. No. 11,216, 834) which was filed on Mar. 15, 2019. U.S. patent application Ser. No. 16/355,386 is hereby incorporated herein by reference in its entirety. Priority to U.S. patent application Ser. No. 16/355,386 is hereby claimed.

FIELD OF THE DISCLOSURE

This disclosure relates generally to media audience measurement, and, more particularly, to methods and apparatus to estimate population reach from different marginal rating unions.

BACKGROUND

Traditionally, audience measurement entities have measured audience engagement levels for media based on registered panel members. That is, an audience measurement entity (AME) enrolls people who consent to being monitored into a panel. The AME then monitors those panel members to determine media (e.g., television programs, radio programs, movies, DVDs, advertisements, streaming media, websites, etc.) presented to those panel members. In this manner, the AME can determine exposure metrics for different media based on the collected media measurement data.

Techniques for monitoring user access to Internet resources, such as webpages, advertisements and/or other Internet-accessible media, have evolved significantly over the years. Internet-accessible media is also known as online media. Some known systems perform such monitoring primarily through server logs. In particular, entities serving media on the Internet can use known techniques to log the number of requests received at their servers for media.

BRIEF DESCRIPTION OF THE DRAWINGS

FIGS. 2A-2C illustrate example panelist data and database proprietor and data corresponding tree structures to represent such data.

In general, the same reference numbers will be used throughout the drawing(s) and accompanying written description to refer to the same or like parts.

Figure 1:
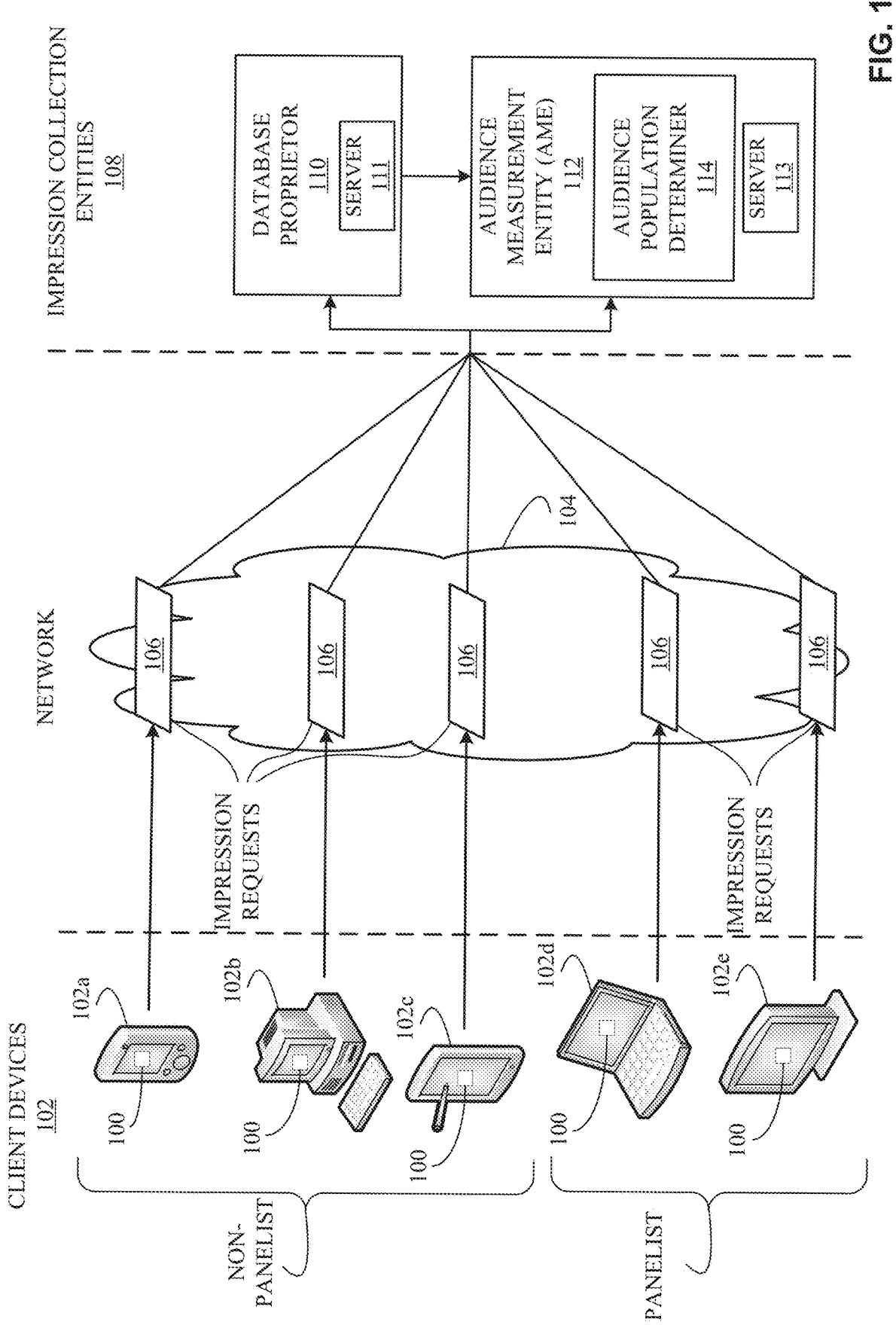
FIG. 1 illustrates example client devices that report audience impression requests for Internet-based media to impression collection entities to facilitate estimating sizes of audiences exposed to different Internet-based media and/or different unions of Internet-based media.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components

DETAILED DESCRIPTION

Techniques for monitoring user access to Internet-accessible media, such as websites, advertisements, content and/or other media, have evolved significantly over the years. Internet-accessible media is also known as online media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server side log monitoring techniques described above. For example, Blumenau disclosed a technique wherein Internet media to be tracked is tagged with monitoring instructions. In particular, monitoring instructions are associated with (e.g., located in) the hypertext markup language (HTML) of the media to be tracked. When a client requests the media, both the media and the monitoring instructions are downloaded to the client. The monitoring instructions are, thus, executed at a client device (e.g., by a web browser) whenever the media is accessed, be it accessed from a server or from a cache.

Monitoring instructions (also referred to herein as beacon instructions) cause monitoring data reflecting information about an access to the media to be sent from the client that downloaded the media to a monitoring entity. Sending the monitoring data from the client to the monitoring entity is known as an impression request (also referred to as a beacon request). Typically, the monitoring entity is an AME that did not provide the media to the client and who is a trusted (e.g., neutral) third party for providing accurate usage statistics (e.g., The Nielsen Company, LLC). Advantageously, because the impression requests are associated with the media and executed by the client browser whenever the media is accessed, the monitoring information is provided to the AME (e.g., via an impression request) irrespective of whether the client corresponds to a panelist of the AME.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, etc.), etc. These database proprietors set cookies and/or other device/user identifiers on the client devices of their subscribers to enable the database proprietor to recognize their subscribers when they visit their websites.

The protocols of the Internet make cookies inaccessible outside of the domain (e.g., Internet domain, domain name, etc.) on which they were set. Thus, a cookie set in, for example, the amazon.com domain is accessible to servers in the amazon.com domain, but not to servers outside that domain. Therefore, although an AME might find it advantageous to access the cookies set by the database proprietors, they are unable to do so.

The inventions disclosed in Mainak et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mainak et al. accomplish this task by structuring the AME to respond to impression requests from clients (who may not be a member of an audience member panel and, thus, may be unknown to the audience member entity) by redirecting the clients from the AME to a database proprietor, such as a social network site partnered with the audience member entity, using an impression response. Such a redirection initiates a communication session between the client accessing the tagged media and the database proprietor. For example, the impression response received from the AME may cause the client to send a second impression request to the database proprietor. In response to receiving this impression request, the database proprietor (e.g., Facebook) can access any cookie it has set on the client to thereby identify the client based on the internal records of the database proprietor. In the event the client corresponds to a subscriber of the database proprietor, the database proprietor logs/records a database proprietor impression in association with the client/user and subsequently forwards logged database proprietor impressions to the AME.

As used herein, an impression is defined to be an event in which a home or individual accesses and/or is exposed to media (e.g., an advertisement, content, an advertisement campaign, a group of advertisements and/or a collection of content). In Internet advertising, a quantity of impressions or impression count is the total number of times media has been accessed by a web population (e.g., the number of times the media is accessed). In some examples, an impression or media impression is logged by an impression collection entity (e.g., an AME or a database proprietor) in response to a beacon request from a user/client device that requested the media. In some examples, a media impression is associated with demographics of an audience member to which the impression is attributed. As used herein, a demographic impression is a media impression logged or stored in association with corresponding demographics. A panelist impression is a media impression logged an AME from an panelist of the AME corresponding to a household and/or audience member exposed to media. As used herein, a database proprietor impression is an impression recorded by a database proprietor in response to a beacon request from a client device of a registered subscriber of the database proprietor.

In the event the client does not correspond to a subscriber of the database proprietor, the database proprietor may redirect the client to the AME and/or another database proprietor. If the client is redirected to the AME, the AME may respond to the redirection from the first database proprietor by redirecting the client to a second, different database proprietor that is partnered with the AME. That second database proprietor may then attempt to identify the client as explained above. This process of redirecting the client from database proprietor to database proprietor can be performed any number of times until the client is identified and the media exposure logged, or until all database partners have been contacted without a successful identification of the client. In some examples, the redirections occur automatically so the user of the client is not involved in the various communication sessions and may not even know they are occurring.

Periodically or aperiodically, the partnered database proprietors provide their logs and/or demographic information to the AME, which then compiles the collected data into statistical reports identifying audience members for the media.

In some disclosed examples, an AME sends a list of logged impressions for particular online media to one or more database proprietor(s). The database proprietor(s) respond with a number of recorded database proprietor impressions from the database proprietor audience, and the size of the database proprietor audience. In other examples, the database proprietor may receive media impression requests for media directly from client devices (e.g., without being redirected by the AME) that access the media via one or more websites. In some examples, accessing media may include media retrieved from a server through a website in response to a user-request specifically requesting the media. In some examples, the media could be delivered by a server for presentation via a website without a user intentionally requesting the media. For example, some media is presented on a website as a result of the website being programmed to request and present the media as part of the website being rendered. The database proprietor may record a quantity of media impressions (e.g., impressions that are not matched with a user of the database proprietor) and a quantity of database proprietor impressions (e.g., impressions that are matched with a user of the database proprietor). In these other examples, the database proprietor will provide the total quantity of media impressions not matched to a user of the database proprietor and the total quantity of database proprietor impressions (e.g. the partial audience) to the AME.

Examples disclosed herein receive the marginal media exposure data (e.g., different episodes of a streaming series, different quarter hour time slots of an online program, or an online radio program, different webpages, etc.) for different unions of marginal data and/or smaller unions and estimates a total population reach (e.g., a total number of deduplicated users that were exposed to media in either margin of the union) across all of the different unions. As used herein, a margin or marginal is a subpart of media. For example, if the media corresponds to advertisement, the margins may be different websites that include the advertisement. In another example, if the media corresponds to a one-hour program, the margins may be 4 15-minute increments of the one-hour program. As used herein, a union can be made up of smaller unions (e.g., a union of smaller unions of marginals, such as a union of smaller unions of time-periods) and/or individual marginals (e.g., websites, advertisements, time-periods (such as quarter hours), etc.). For example, a first union may include a first quarter hour marginal and a second subsequent quarter hour marginal, a second union may include a third, fourth, and fifth quarter hour marginal, and a third union may include the first union and the second union. As used herein, child unions or children are the marginal time intervals and/or smaller unions that make up a larger union and a parent union or a parent is a larger union that includes the child union(s) and/or children. Using the above example, the children of the first union include the first quarter hour marginal and the second quarter hour marginal and the parent of the first union is the third union.

In some examples, the audience measurement entity processes the collected and/or aggregated panelist impression data corresponding to panelist impressions from panelists. Additionally, the audience measurement entity obtains (e.g., from one or more service provider) database proprietor impression data for devices that are not part of a panel maintained by the AME (e.g., corresponding to the population of users (universe estimate)). Database proprietor impression data may include, for example, a total number of impressions from a universe of users that was exposed to media within different margins (e.g., 15 minute increments, websites, etc.). However, database proprietor impression data may not include a total number of deduplicated unique users (e.g., a population audience) from a universe of users that was exposed to the media within a margin and/or within two or more margins (e.g., unions). Panelist impression data includes a total number of impressions from the panel that was exposed to the media within the different margins and the total panelist audience size (e.g., the deduplicated audience size) for the different margins and/or different unions. Accordingly, examples disclosed herein leverage panelist impression data to be able to estimate unique audiences of universe and/or population (e.g., reach) at the different margins and/or across different unions of time. As used herein, reach is a cumulative deduplicated total of a population that has been counted as a viewer of the media at least once during a margin and/or union. For example, if the union is a union of two web pages, the reach of a first web page is the total deduplicated population audience of the first web page, and the reach of a union of the two web pages is the total deduplicated population audience of at least one of the two web pages.

Some traditional techniques of determining the total population reach for a margin or a union of marginal media ratings data include numerical calculations that enumerate all combinations in which someone can be exposed to media based on the individual marginal media ratings of making up the union. For example, estimating reach for across ten websites that can be visited by the same user up to 20 times, the number of calculations needed to solve for the reach using traditional numerical techniques is approximately $21^{10}$, thereby exceeding the memory limit and/or processing power of any existing computer. Examples disclosed herein alleviate such memory/processing resource problems associated with such a traditional technique by calculating the solution using the disclosed analytical process. Using examples disclosed herein a reach can be determined across a large number of websites without a limit to how many times the user can view the website. Examples disclosed here symbolically can solve (infinity^n) probabilities with finite number of parameters with no restriction to an upper limit of impression frequency. Because infinity$^n$ calculations is impossible to solve numerically, such examples are impossible solve using traditional numerical techniques.

To estimate the total population reach of a margin and/or union (e.g., population margin/union reach), examples disclosed herein develop a tree graph association or tree association for the margins and union(s). The tree graph association corresponds to the structure of the margins and/or unions where each margin and each union corresponds to a node. Examples disclosed herein tag each node as a descendant (e.g., child, grandchild, etc.) and/or ancestor (e.g., parent, grandparent, etc.) depending on the structure of the unions corresponding to stored panel data. For example, if panel data includes a unique audience number or percentage corresponding to three margins (e.g., A, B, and C) and the panel data further includes a unique audience number or percentage corresponding to a first union (e.g., AB) and a second union (e.g., ABC), examples disclosed herein may tag (1) nodes A and B as having parent AB and grandparent ABC, (2) node C as having parent ABC, (3) node AB as having children A and B and parent ABC, and (4) node ABC as having children AB and C and grandchildren A and B. Additionally, examples disclosed herein may tag the margin nodes (e.g., A, B, and C) as leaves and tag ABCD as a root. As used herein, a leaf is a node that does not have children and a root is a node that has no parents.

As described above, the database proprietor impression data (e.g., corresponding to the population or total audience) may include a total number of impressions corresponding to particular margins, but may not include unique audience data for the margins and/or unions of the margins. Accordingly, once the tree structure association is complete, example disclosed herein utilize the panelist impression data and corresponding tree structure association to solve for unique audience(s) (e.g., reach(es)) of margins and/or unions of the population based on the database proprietor impression data). The unique audience of a particular margin and/or union corresponding to a node of the tree structure association can be determined by taking the difference between the total audience and the total audience of the union were removed from the tree association (e.g., the statistical rule of subtraction), as shown in the below-Equation 1. Examples disclosed herein leverage Equation 1 to determine unique audiences for a population union.

$$\text{AUD}(X) = \text{AUD}(T) - A(T\backslash X) \quad \text{(Equation 1)}$$

In Equation 1 above, AUD(X) represents the unique audience of union or margin X (e.g., the audience which belonged to at least one of the margins corresponding to union X), the total audience AUD(T) represents the total audience, and the total audience AUD(T\X) represents the total audience excluding the audience members of union X. In some examples, AUD(T) may be known (e.g., for panelist data). AUD(T) corresponds to the below-Equation 2.

$$\text{AUD}(T) = z_0 z_N s_N \quad \text{(Equation 2)}$$

In Equation 2 above, $z_0$ corresponds to a normalize constraint representative of a percentage of the total audience not exposed to the media, N corresponds to the node of the total audience, $z_i = e^{\lambda_i}$, where $\lambda$ is an unknown Lagrange multiplier corresponding to an audience (e.g., which can be solved for), and $s_N$ is defined recursively by node height (e.g., margins being nodes at the lowest height, unions of margins being at the next lowest height, etc.) based on the tree association using the Equation 3, as shown below.

$$s_i = \begin{cases} y_i, & \text{if node } i \text{ is a leaf} \\ \Pi_{j \in children(i)}(1 + s_j z_j) - 1, & \text{if node } i \text{ has children} \end{cases} \quad \text{(Equation 3)}$$

As used herein, node height refers to the level or hierarchy level of the tree structure. For example, all the leaf nodes (e.g., margins) correspond to the lowest height and the root node (e.g., the union corresponding to all leaf nodes of a tree association structure) corresponds to the highest height. In the preceding equation, $y_i=e^{\delta i}$, where $\delta$ is an unknown Lagrange multiplier corresponding to impression counts (e.g., which can be solved for). As the calculations of $s_i$ depend on its children, if any, examples disclosed herein utilize parallel commercial solvers to solve for $s_i$ in parallel (e.g., independently) at each height to be combined at a later height.

As described above, AUD(T\X) corresponds to the audience of T when the audience of the union and/or margin X is removed from the tree structure, so the new graph only contains people who visited anything other than X. Because removing a union and/or margin X only affects the ancestors of X, AUD(T\X) can be determined based on the below-Equation 4. Utilizing Equation 4 reduces the number of computations for tree structure associations (e.g., the larger the number of nodes in the tree structure association, the larger the reduction of computations), because updating the ancestors to compute AUD(T\X) (e.g., using the below Equation 4) can be done in parallel, once for each node. Although new tree associations can be calculated for each node removal graph to determine the total audience of Equation 3, Equation 4 utilizes the property that the only $s_i$ variables which are impacted by node deletion are the ancestors of that node $$\text{AUD}(T\backslash X)=z_0 z_N s_N^{(new)} \quad \text{(Equation 4)}$$

In Equation 4 above, $s_N^{(new)}$ is defined recursively by node height (e.g., margins being nodes at the lowest height, unions of margins being at the next lowest height, etc.) when the X union and/or margin is removed. $s_N^{(new)}$ can be determined using the Equation 5, as shown below.

$$s_{k_j}^{(new)} = \begin{cases} \dfrac{s_{k_1}+1}{1+s_{k_0} z_{k_0}} - 1, & j=1 \\ \left(\dfrac{s_{k_j}+1}{1+s_{k_j} z_{k-1}}\right)\left(1 + s_{k_{j-1}}^{(new)} z_{k_{j-1}}\right) - 1, & j=2,\dots,J \end{cases} \quad \text{(Equation 5)}$$

In Equation 5 above, $k_j$ is the node representing the $j^{th}$ ancestor of X (e.g., $k_0$ is X, $k_1$ is the parent of X, ... $k_J$ is node N, the root node). As the calculations of $s_{k_j}$ depend on its children, if any, examples disclosed herein, when solving for $s_{k_j}$, can utilize parallel commercial solvers to solve for $s_{k_j}$ in parallel (e.g., independently) at each height to be combined at a later height.

Equation 1 (e.g., corresponding to Equations 2-5) results in a system of equations with variable Lagrange multipliers (audience-based Lagrange multipliers $\lambda$s and impression-based Lagrange multipliers ($\delta$s). Examples disclosed herein determine the unique audience of one or more unions based on database proprietor impression data corresponding to the margins and panelist data corresponding to the margins and the unions by performing three tasks corresponding to Equation 1. The first task includes solving a system of Equations corresponding to the below Equations 6, 7, and 8 with respect to the panelist data.

$$\text{AUD}(T)-\text{AUD}(T\backslash\{i\})=A_i \text{ for all nodes of the tree structure association } i=\{1,\dots,N\} \quad \text{(Equation 6)}$$

$$z_0+\text{AUD}(T)=100\% \quad \text{(Equation 7)}$$

$$\text{IMP}(\{i\})=(1+y_i)\text{AUD}(\{i\}) \quad \text{(Equation 8)}$$

In Equation 7 above, $z_0$ represents the total audience (e.g., panelist audience size) that was not exposed to the media, $y_i$ is an unknown variable corresponding to the impression-based Lagrange multipliers $\delta$s (e.g., $y_i=e^{\delta i}$) to be solved for, and IMP($\{i\}$) is the number of impressions corresponding to node i (e.g., the margin and/or union that corresponds to node i). Equations 6, 7, and 8 correspond to a system of equations with audience-based Lagrange multipliers $\lambda$s as solutions to the system. Estimates of AUD(T\$\{i\}$) (corresponding to the above Equations 4 and 5) can be determined using commercial solvers in parallel. The commercial solvers estimating values for the audience-based Lagrange multipliers $\lambda$s of AUD(T\$\{i\}$) and iteratively adjusting such that until all the constraints of Equations 6, 7, and 8 are met. Because AUD(T) is known in panelist data, it follows that $\lambda_0=\ln(1-A_N)$, where $A_N$ is AUD(T). Additionally, because AUD($\{i\}$) is known in panelist data, it follows that $\delta_0=\ln(I_i/A_i-1)$, where $A_i$ is AUD($\{i\}$). Although it is assumed all quantities of audiences in the above Equations are expressed in percentages of the Universe Estimate (e.g., Equation 8 illustrates that for total population), Equations 1-8 may be used in conjunction with audience totals by slightly adjusting the Equations.

Once the first task is complete, examples disclosed herein perform a second task in which the determined Lagrange multipliers that correspond to known database proprietor impression information (e.g., the impression-based Lagrange multipliers $\delta$s corresponding to the panelist impression counts of the first task and the determined Lagrange multipliers $\lambda_0/z_0$ corresponding to the normalized constraint of the audience of the first task) are discarded. However, different subsets of the audience-based Lagrange multipliers $\lambda$s and/or impression-based Lagrange multipliers $\delta$s may be kept and/or discarded based on the census data based on the known and unknown information from the database proprietor. In response to discarding the Lagrange multipliers that correspond to known database proprietor impression information (e.g., Lagrange multipliers $\delta$s, $\lambda_0$ and $z_0$), examples disclosed herein solve the system corresponding to Equations 7 and 8 using the database proprietor impression data, the now unknown normalized constraint $z_0$, the now unknown impression-based Lagrange multipliers $\delta$s, and the known kept audience-based Lagrange multipliers of the first task (e.g., audience-based Lagrange multipliers $\lambda$s), thereby resulting in a set of impression-based Lagrange multipliers $\hat{\delta}$s based on both the panelist impression data and the database proprietor impression data. Once the second task is complete, examples disclosed herein perform a third task to solve for the missing population unions using Equation 6 with the kept audience-based Lagrange multipliers $\lambda$s of the first task and the database proprietor impression-based Lagrange multipliers $\hat{\delta}$s of the second task. As used herein the hat notation ($\hat{\ }$) corresponds to the solutions to systems of equations based on the second task (e.g., based on panelist impression counts and database proprietor impression counts). As used herein, variable bearing the hat notation ($\hat{\ }$) are referred to as database proprietor audiences and/or database proprietor impression-based Lagrange multipliers. During the second the marginal audience totals are implicitly calculated during the determining of the impression constraints. Accordingly, examples disclosed here may save the marginal audience totals during the determination of the impression constraints. However, if not saved, examples disclosed herein can utilize the below Equation 9

(e.g., which is a rephrased version of the second task described above) to calculate the marginal audiences for the population.

$$\tilde{A}_i = AUD(\{i\}) = \frac{\tilde{I}_i}{1 + \tilde{y}_i}$$ (Equation 9)

FIG. 1 illustrates example client devices 102 that report audience impression requests for Internet-based media 100 to impression collection entities 108 to identify a unique audience and/or a frequency distribution for the Internet-based media. The illustrated example of FIG. 1 includes the example client devices 102, an example network 104, example impression requests 106, and the example impression collection entities 108. As used herein, an impression collection entity 108 refers to any entity that collects impression data such as, for example, an example AME 112 and/or an example database proprietor 110. In the illustrated example, the AME 112 includes an example audience population determiner 114.

The example client devices 102 of the illustrated example may be any device capable of accessing media over a network (e.g., the example network 104). For example, the client devices 102 may be an example mobile device 102a, an example computer 102b, 102d, an example tablet 102c, an example smart television 102e, and/or any other Internet-capable device or appliance. Examples disclosed herein may be used to collect impression information for any type of media including content and/or advertisements. Media may include advertising and/or content delivered via websites, streaming video, streaming audio, Internet protocol television (IPTV), movies, television, radio and/or any other vehicle for delivering media. In some examples, media includes user-generated media that is, for example, uploaded to media upload sites, such as YouTube, and subsequently downloaded and/or streamed by one or more other client devices for playback. Media may also include advertisements. Advertisements are typically distributed with content (e.g., programming, on-demand video and/or audio). Traditionally, content is provided at little or no cost to the audience because it is subsidized by advertisers that pay to have their advertisements distributed with the content. As used herein, "media" refers collectively and/or individually to content and/or advertisement(s).

The example network 104 is a communications network. The example network 104 allows the example impression requests 106 from the example client devices 102 to the example impression collection entities 108. The example network 104 may be a local area network, a wide area network, the Internet, a cloud, or any other type of communications network.

The impression requests 106 of the illustrated example include information about accesses to media at the corresponding client devices 102 generating the impression requests. Such impression requests 106 allow monitoring entities, such as the impression collection entities 108, to collect a number of media impressions for different media accessed via the client devices 102. By collecting media impressions, the impression collection entities 108 can generate media impression quantities for different media (e.g., different content and/or advertisement campaigns).

The impression collection entities 108 of the illustrated example include the example database proprietor 110 and the example AME 112. In the illustrated example, the example database proprietor 110 may be one of many database proprietors that operate on the Internet to provide services to subscribers. Such services may be email services, social networking services, news media services, cloud storage services, streaming music services, streaming video services, online retail shopping services, credit monitoring services, etc. Example database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, etc.), and/or any other site that maintains user registration records.

In some examples, execution of the beacon instructions corresponding to the media 100 causes the client devices 102 to send impression requests 106 to servers 111, 113 (e.g., accessible via an Internet protocol (IP) address or uniform resource locator (URL)) of the impression collection entities 108 in the impression requests 106. In some examples, the beacon instructions cause the client devices 102 to provide device and/or user identifiers and media identifiers in the impression requests 106. The device/user identifier may be any identifier used to associate demographic information with a user or users of the client devices 102. Example device/user identifiers include cookies, hardware identifiers (e.g., an international mobile equipment identity (IMEI), a mobile equipment identifier (MEID), a media access control (MAC) address, etc.), an app store identifier (e.g., a Google Android ID, an Apple ID, an Amazon ID, etc.), an open source unique device identifier (OpenUDID), an open device identification number (ODIN), a login identifier (e.g., a username), an email address, user agent data (e.g., application type, operating system, software vendor, software revision, etc.), an Ad ID (e.g., an advertising ID introduced by Apple, Inc. for uniquely identifying mobile devices for purposes of serving advertising to such mobile devices), third-party service identifiers (e.g., advertising service identifiers, device usage analytics service identifiers, demographics collection service identifiers), etc. In some examples, fewer or more device/user identifier(s) may be used. The media identifiers (e.g., embedded identifiers, embedded codes, embedded information, signatures, etc.) enable the impression collection entities 108 can identify to media (e.g., the media 100) objects accessed via the client devices 102. The impression requests 106 of the illustrated example cause the AME 112 and/or the database proprietor 110 to log impressions for the media 100. In the illustrated example, an impression request is a reporting to the AME 112 and/or the database proprietor 110 of an occurrence of the media 100 being presented at the client device 102. The impression requests 106 may be implemented as a hypertext transfer protocol (HTTP) request. However, whereas a transmitted HTTP request identifies a webpage or other resource to be downloaded, the impression requests 106 include audience measurement information (e.g., media identifiers and device/user identifier) as its payload. The server 111, 113 to which the impression requests 106 are directed is programmed to log the audience measurement information of the impression requests 106 as an impression (e.g., a media impression such as advertisement and/or content impressions depending on the nature of the media accessed via the client device 102). In some examples, the server 111, 113 of the database proprietor 101 or the AME 112 may transmit a response based on receiving an impression request 106. However, a response to the impression request 106 is not necessary. It is sufficient for the server 111, 113 to receive the impression request 106 to log an impression request 106. As such, in examples disclosed herein, the impression request 106 is a dummy HTTP request for the purpose of reporting an impressions but to which a receiving server need not respond to the originating client device 102 of the impression request 106.

The example database proprietor 110 maintains user account records corresponding to users registered for services (such as Internet-based services) provided by the database proprietors. That is, in exchange for the provision of services, subscribers register with the database proprietor 110. As part of this registration, the subscribers provide detailed demographic information to the database proprietor 110. Demographic information may include, for example, gender, age, ethnicity, income, home location, education level, occupation, etc. In the illustrated example, the database proprietor 110 sets a device/user identifier on a subscriber's client device 102 that enables the database proprietor 110 to identify the subscriber.

In the illustrated example, the example AME 112 does not provide the media 100 to the client devices 102 and is a trusted (e.g., neutral) third party (e.g., The Nielsen Company, LLC) for providing accurate media access (e.g., exposure) statistics. The example AME 112 includes the example audience population determiner 114. As further disclosed herein, the example audience population determiner 114 provides media access statistics related to the example impression requests 106.

The audience population determiner 114 calculates a total reach (e.g., a total unique audience) exposed to particular media (e.g., the media 100) for one or more margins (e.g., durations of time, websites, advertisements, etc.) and/or unions (e.g., two or more combinations the margins) based on the panelist impression totals and database proprietor impression totals from the example database proprietor 110. The example audience population determiner 114 receives panelist impression counts from client device 102 of panelists according to margins (e.g., different time-periods (quarter hours, half hours, hours, days, etc.), websites, episodes, advertisements, etc.) of the media 100. The audience population determiner 114 stores the impression in conjunction with the panelist identifiers corresponding to the panelist impression count. In this manner, the audience population determiner 114 can determine the total unique panelists that were exposed to the media 100 for each margin, the total unique panelist that were exposed to the media 100 across unions, and the total number of impression counts for the media 100 at each margin. Additionally, the example audience population determiner 114 receives (e.g., from the database proprietor 110) and stores the total number of database proprietor impression counts logged by the database proprietor 110.

Additionally, the example audience population determiner 114 may receive union data related to unions of the different marginals and/or may be structured to develop preset unions based on margins of a particular media. For example, the audience population determiner 114 may receive unions based on instructions from a user and/or a manufacturer. The received unions may be representative of combinations of time-based margins (e.g., a half hour, an hour, a daypart, and/or any combination of time interval corresponding to some or all of the quarter hours for a particular day) websites, episodes, advertisements, etc. In some examples, a union may include multiple unions. For example, union ABCD (e.g., 15 minute margins of an hour show, four episodes of a web series, four advertisements on different web pages, etc.) may be a union of union AB (e.g., a first union of the first two 15 minute increments representative of the unique panel audience of the first 30 minutes of the show, a first union of the first two episodes of a web series, etc.) and union CD (e.g., a second union of the second two 15 minute increments representative of the unique panel audience of the second 30 minutes of the show, a second union of the second two episodes of a web series, etc.), where union AB is a union of marginal A and marginal B and union CD is a union of marginal C and marginal D. Each union may have corresponding descendants and/or ancestors. Using the above example, the parent of union AB is union ABCD and the children of union AB are A and B. Each union corresponds to a union reach (e.g., a deduplicated number of people exposed to media across all marginals in the union). The example audience population determiner 114 generates a tree structure association by tagging each node (e.g., each margin or union) with the corresponding descendants and/or ancestors.

Once the example audience population determiner 114 of FIG. 1 determines and/or obtains the panelist impression totals for the margins, the panelist unique audience totals for the margins and the unions, and the population impression totals (e.g., corresponding to the database proprietor impression counts) of the margins, the audience population determiner 114 uses the above Equations 1-9 to perform three tasks to determine the reach(es) of one or more of the unions for the population. The audience population determiner 114 executes the first task by utilizing commercial solvers to determine audience-based Lagrange multipliers $\lambda$s and impression-based Lagrange multipliers $\delta$s from a system of equations corresponding to Equations 6-8 based on the panelist data. The audience population determiner 114 executes the second task by utilizing commercial solvers to discard the impression-based Lagrange multipliers $\delta$s corresponding to known database proprietor information (e.g., panelist impression counts of the first task and $\lambda_0/z_0$ corresponding to the normalized constraint of the audience of the first task, thereby returning the Lagrange multipliers $\delta$s, $\lambda_0$ and $z_0$ and to variables) and keep the solved Lagrange multipliers corresponding to unknown panelist data (e.g., audience-based Lagrange multipliers $\lambda$s corresponding to the audiences from the first task). The audience population determiner 114 determines the $\delta$^s (e.g., corresponding to the now variable Lagrange multipliers $\delta$s, $\lambda$0, and $z_0$) from a system of equations corresponding to Equations 6-8 based on the audience-based Lagrange multipliers $\lambda$s determined from the first task and the database proprietor impression totals corresponding to the margins. The audience population determiner 114 executes the third task by solving for the missing population unions using Equation 6 with the audience-based Lagrange multipliers $\lambda$s of the first task and the $\delta$^s of the second task. During the second the marginal audiences are implicitly calculated when solving for the impression constraints. However, if not saved, examples disclosed herein can utilize the above Equation 9 (e.g., which is a rephrased version of the second task) to calculate the marginal audiences for the population.

In operation, the example client devices 102 employ web browsers and/or applications (e.g., apps) to access media. Some of the web browsers, applications, and/or media include instructions that cause the example client devices 102 to report media monitoring information to one or more of the example impression collection entities 108. That is, when the client device 102 of the illustrated example accesses media, a web browser and/or application of the client device 102 executes instructions in the media, in the web browser, and/or in the application to send the example impression request 106 to one or more of the example impression collection entities 108 via the network (e.g., a local area network, wide area network, wireless network, cellular network, the Internet, and/or any other type of network). The example impression requests 106 of the illustrated example include information about accesses to the media 100 and/or any other media at the corresponding client devices 102 generating the impression requests 106. Such impression requests allow monitoring entities, such as the example impression collection entities 108, to collect media impressions for different media accessed via the example client devices 102. In this manner, the impression collection entities 108 can generate media impression quantities for different media (e.g., different content and/or advertisement campaigns).

When the example database proprietor 110 receives the example impression request 106 from the example client device 102, the example database proprietor 110 requests the client device 102 to provide a device/user identifier that the database proprietor 110 had previously set for the example client device 102. The example database proprietor 110 uses the device/user identifier corresponding to the example client device 102 to identify the subscriber of the client device 102.

The example AME 112 receives database proprietor demographic impression data from the example database proprietor 110. The database proprietor demographic impression data may include information relating to a total number of the logged database proprietor impressions that correspond with a registered user of the database proprietor 110 and/or any other information related to the logged database proprietor impressions (e.g., demographics, a total number of registered users exposed to the media 100 more than once, etc.). The example audience population determiner 114 determines a total unique audience across different margins and/or unions based on impression requests 106.

FIGS. 2A-2C illustrate an example transformation of example marginal and union data and a corresponding representation of a tree structure association that may be generated by the example audience population determiner 114 of FIG. 1. FIG. 2A includes example marginal and union data 200. FIG. 2B includes an example tree structure 202. FIG. 2C includes an example tree structure conversion 204 corresponding to a removal of a node, and an example resulting node removal tree structure 206.

The example marginal and union data 200 of FIG. 2A corresponds to the total number of panelist impression counts for four margins (e.g., A, B, C, D), a unique panelist audience size for the four margins and the unique panelist audience size for different unions of the margins (e.g., AB, CD, and ABCD). For example, the audience population determiner 114 may be instructed (e.g., based on user, manufacturer, and/or preset instructions) to generate reaches (e.g., a unique deduplicated audience for the population) across union AB, union CD, and union ABCD. In such an example, the audience population determiner 114 accesses panelist data corresponding to the panelist impressions for the margins to determine unique panelist audience sizes that were exposed to the media 100 at margin A, B, C, D and unique panelist audience sizes that were exposed to the media at unions AB, BC, and ABCD. Accordingly, the audience population determiner 114 processes the panelist impression data to determine the impression data totals and/or to remove duplicate panelist data for the unions (e.g., panelist that were included more than one margin corresponding to a union). Although the example marginal and union data 200 of FIG. 2 corresponds to website visits, the marginal and union data 200 may correspond to any type of media. For example, the marginal and union data 200 may correspond store visits from consumers across different margins (e.g., stores) and unions (e.g., combination of stores) and the impressions may correspond to purchases made at the stores.

For example, as shown in the marginal and union data 200 of FIG. 2A, the audience population determiner 114 determines that 100 panelists were exposed to the media during margin A (e.g., a first website), 200 panelists were exposed to the media during margin B (e.g., a second website), 300 panelists were exposed to the media during margin C (e.g., a third website), 400 panelists were exposed to the media during margin D (e.g., a fourth website), 250 panelists were exposed to the media during union AB (e.g., the first website and/or the second website), 550 panelists were exposed to the media during union CD (e.g., the first website and/or the fourth website), and 700 panelists were exposed to the media during union ABCD (e.g., any one of and/or any combination of the four websites). Additionally, the audience population determiner 114 obtains database proprietor impression totals corresponding to the population exposed of the media at the margins A, B, C, and D from the database proprietor 110. In the example of FIG. 2A, the audience population determiner 114 determines that are 400 population impressions for the first margin A, 600 population impressions for the second margin B, 800 population impressions for the third margin C, and 1000 population impressions for the fourth margin D.

The example tree structure 202 of FIG. 2B corresponds to the tree structure of the margins and unions of the example marginal and union data 200 of FIG. 2A. The tree structure 202 corresponds to a tree linkage of margins and unions based on the unions identified in the example margin and union data 200. Alternatively, other tree structures can be generated based on different combination of margins and/or unions (e.g., so long as each node has no more than one parent). The example audience population determiner 114 generates a tree structure association or tree associations corresponding to the example tree structure 202 by tagging the margins and/or unions with corresponding node numbers, ancestors, and/or descendants. For example, the audience population determiner 114 may tag the AB union with a node number (e.g., 5) and may tag the AB node as having a parent union of ABCD (e.g., node 7) and children margins A and B (e.g., nodes 1 and 2). In this manner, commercial solvers of the audience population determiner 114 can utilize the values of the example margin and union data 200 for the corresponding variables of the above Equations 1-9.

The example tree structure conversion 204 of FIG. 2C illustrates a removal of a node (e.g., node 6 corresponding to union CD) from the example tree structure 202, thereby resulting in the example node removal tree structure 206 of FIG. 2B. The example tree structure 202 corresponds to the total audience (e.g., AUD(T) of Equations 1, 2, 6, and 7) while the example node removal tree structure 206 corresponds to the total audience if node 6 (e.g., union CD) was removed (e.g., AUD(T\6) of Equations 1, 4 and 6). The example union population reach determiner 114 can compute AUD(T/6) using a first technique by utilizing the example node removal tree structure 206 itself and utilize the above Equation 3 or using a second technique by computing s values of only the ancestors that are impacted (e.g., using Equation 5), thereby conserving memory and time by eliminating computations corresponding to the first technique. The example audience population determiner 114 can determine the population audience of union CD by leveraging the fact that the audience of CD is equivalent to the audience of ABCD minus the audience of ABCD if the CD union is removed, as shown in the example node removal tree structure 206.

Figure 3:
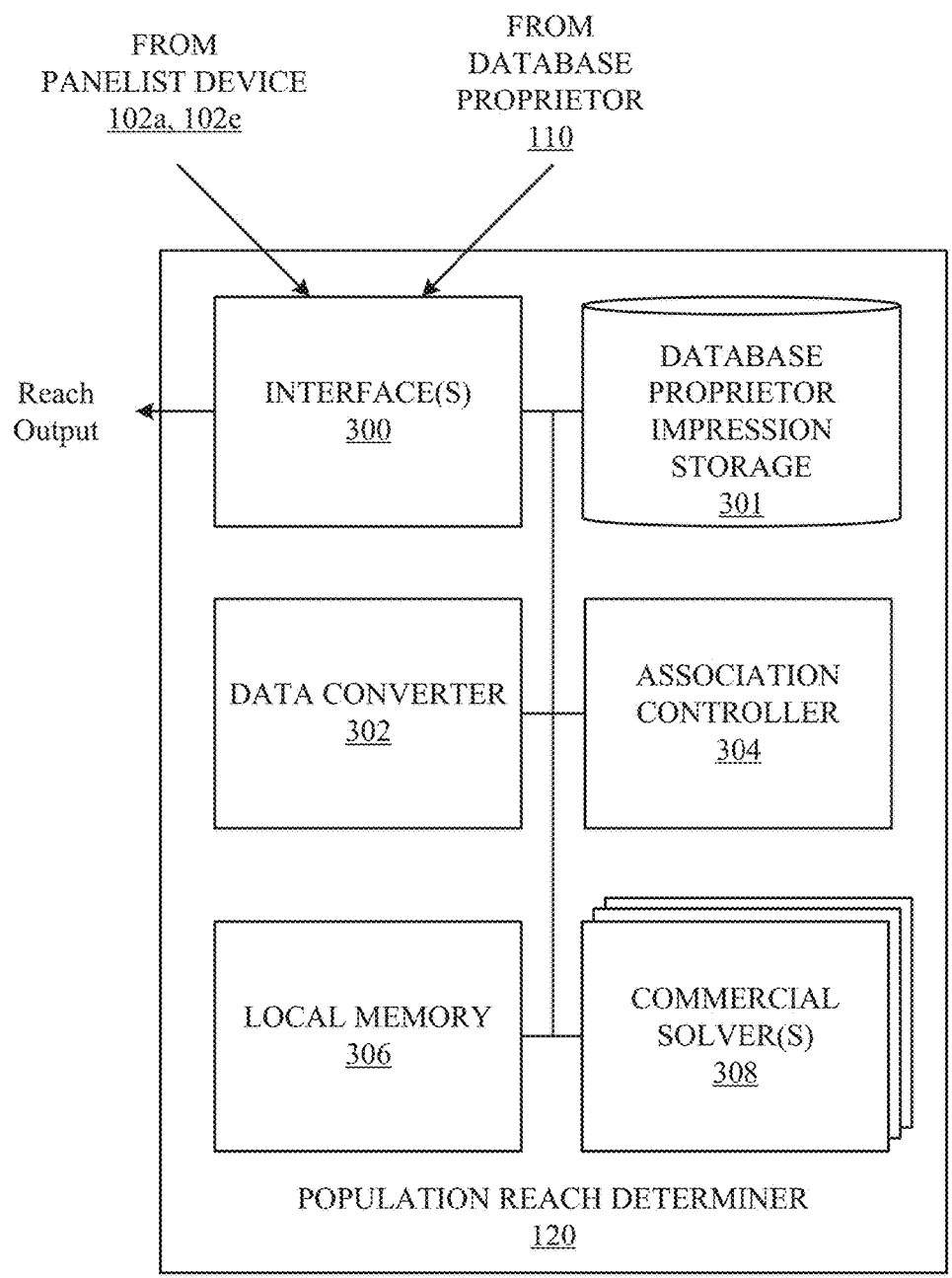
FIG. 3 is a block diagram of an example implementation of the example audience population determiner of FIG. 1.

FIG. 3 is a block diagram of the example audience population determiner 114 of FIG. 1 to determine population reach for given media based on unions of marginal ratings data. The example audience population determiner 114 includes an example interface(s) 300, an example panelist impression storage 301, an example data converter 302, an example association controller 304, an example local memory 306, and an example commercial solver(s) 308.

The example interface(s) 300 of FIG. 3 receives panelist impressions from the example panelist devices 102d, 102e of FIG. 1 corresponding to media predefined margins, panelist impression totals from the example database proprietor 110 a universe estimate of the population (e.g., database proprietor user population) from the database proprietor 110. The example panelist impression storage 301 of FIG. 1 stores received panelist impressions in conjunction with a user identifier and the media 100. The received panelist impressions may include data identifying the media 100, a timestamp, a source, etc. Additionally, the example interface(s) 300 may output an estimated population reach(es) (e.g., a deduplicated population audience total) for one or more margins and/or unions to another device/system and/or as a report to a user.

The example data converter 302 of FIG. 3 processes the database proprietor impression counts from the database proprietor 110 and/or the panelist impression data from panelist impression storage 301. The example data converter 302 selects one or more unions to analyze (e.g., to determine population reach(es)). The data converter 302 may be structured to select preset margin(s) and/or union(s) and/or may receive instructions from a user and/or a manufacturer corresponding to one or more margin(s) and/or union(s) to analyze. For example, in the examples described in conjunction with FIGS. 2A-2C, the data converter 302 selects margins A, B, C, D and unions AB, CD, and ABCD. Alternatively, different margins and/or unions based on the different margins may be used so long as each union and/or margin only has one parent. Using the above example, the data converter 302 obtains impression data stored in the example panelist impression storage 301 corresponding to the margins A, B, C, and D. Because each stored impression is stored in conjunction with a panelist identifier, the data converter 302 can deduplicate any duplicate impressions to determine the total number of panelists exposed to the media in conjunction with the margins. For example, if there are two impressions corresponding to the same margin and same panelist, the data converter 302 corresponds to the two panelist impressions to one audience count. In a similar manner, the data converter 302 determines the unique audience of the unions based on the panelist impression data. Additionally, the data converter 302 may convert the audience totals and/or impression totals into percentages (e.g., normalized percentages) by dividing the respective audience totals and/or impression totals by the universe estimate.

The example association controller 304 of FIG. 3 generates the tree structure association based on the margins and selected unions. For example, using the unions and margins of the example of FIG. 2A, the association controller 304 tags each margin and union with (i) a number or other identifier and (ii) with corresponding ancestors and/or descendants. For example, the association controller 304 tags the AB union (e.g., node of the tree structure 202 of FIG. 2) with a node number/identifier (e.g., 5) and tags the AB node/union as having a parent union of ABCD (e.g., node 7) and children margins A and B (e.g., nodes 1 and 2). The association controller 304 stores the tags in conjunction with the panelist and/or population margin and/or union percentages in the example local memory 306. In this manner, the commercial solver(s) 308 can solve a system of equations using the tagged panelist and/or population margin and/or union percentages stored in the example local memory 306.

The example commercial solver(s) 308 of FIG. 3 are optimization software packet(s) that solve(s) one or more system(s) of equations using the tagged panelist and/or population margin and/or union percentages stored in the example local memory 306 to estimate the population reach of one or more union(s) of the margins. For example, the commercial solver(s) 308 may be a CPLEX optimizer, a GNU lineark programming kit (GLPK), a Gurobi Optimizer, a solving constraint integer program, and/or any type of mixed integer programming optimizer. As described above, the commercial solver(s) 308 execute(s) three tasks (e.g., corresponding to solving for parameters in a system of equations) to estimate the population reach(es). The first task results in parameters of the panel, the second task results in parameters of the population (e.g., the database proprietor population), and the third task determines the one or more population reaches for the margins and/or unions based on the parameters of the first task and the second task. For example, the commercial solver(s) 308 solve(s) the system of equations using the above Equation 8 to solve for the Lagrange multipliers (e.g., impression-based Lagrange multipliers $\delta$s). Based on Equation 6, the example commercial solver(s) 308 need to determine AUD(T\{i}) for all nodes i. Additionally, the commercial solver(s) 308 solve(s) the system of equations using the above Equations 6-7 and the determined impression-based Lagrange multipliers $\delta$s with an iterative process utilizing the tagged panelist union and margin data to solve for Lagrange multipliers (e.g., audience-based Lagrange multipliers $\lambda$s) that satisfy the system of Equations 6 and 7. Because removing node i only affects ancestors of i, the example commercial solver(s) 308 can solve for the audience-based Lagrange multipliers $\lambda$s corresponding to AUD(T\{i}) in parallel at each height starting at the lowest height (e.g., the margin height in parallel first, the parent height in parallel second, the grandparent height in parallel third, etc.). For example, the commercial solver(s) 308 can solve for the audience-based Lagrange multipliers $\lambda$s in parallel by performing computations with a processor (e.g., concurrently processing threads in a multi-threading processor, utilizing multiple cores of a multiple ore processor in parallel, utilizing a multiple processor system in parallel, etc.) Completion of the first task results in a set of audience-based Lagrange multipliers $\lambda$s and impression-based Lagrange multipliers $\delta$s, each corresponding to nodes of the tree structure. Once the first task is complete, the example commercial solver(s) 308 perform(s) a second task in which Lagrange multipliers corresponding to known database proprietor data (e.g., the impression-based Lagrange multipliers $\delta$s and audience-based Lagrange multiplier $\lambda_0$ corresponding to the impression counts of the tree structure association of FIG. 2) are discarded and the remaining Lagrange multipliers corresponding to unknown data panelist data (e.g., audience-based Lagrange multipliers $\lambda$s corresponding to audiences at the margins and/or unions of the tree structure association of FIG. 2) are kept. In response to discarding the Lagrange multipliers (e.g., impression-based Lagrange multipliers $\delta$s and impression-based Lagrange multiplier $\lambda_0$), the example commercial solver(s) 308 solve(s) the system corresponding to Equations 6-8 using the database proprietor impressions totals for the margins and the known values of the first task (e.g., $\lambda_1$-$\lambda_N$), thereby resulting in a set of $\hat{\delta}$'s based on both the panelist data and the database proprietor data. Once the second task is complete, the example commercial solver(s) 308 performs a third task using the set of $\hat{\delta}$'s in conjunction with the above Equation 6 to determine the population reach estimate(s) for one or more margin(s) and/or union(s).

While an example manner of implementing the example population reach determiner 120 of FIG. 1 is illustrated in FIG. 3, one or more of the elements, processes and/or devices illustrated in FIG. 3 may be combined, divided, re-arranged, omitted, eliminated and/or implemented in any other way. Further, the example interface(s) 300, the example panelist impression storage 301, the example data converter 302, the example association 304, the example local memory 306, the example commercial solver(s) 308, and/or, more generally, the example population reach determiner 120 of FIG. 3 may be implemented by hardware, software, firmware and/or any combination of hardware, software and/or firmware. Thus, for example, any of the example interface(s) 300, the example panelist impression storage 301, the example data converter 302, the example association 304, the example local memory 306, the example commercial solver(s) 308, and/or, more generally, the example population reach determiner 120 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of example interface(s) 300, the example panelist impression storage 301, the example data converter 302, the example association 304, the example local memory 306, the example commercial solver(s) 308, and/or, more generally, the example population reach determiner 120 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example population reach determiner 120 of FIG. 3 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example population reach determiner 120 of FIG. 1 are shown in FIGS. 4-7. The machine readable instructions may be one or more executable programs or portion(s) of an executable program for execution by a computer processor such as the processor 812 shown in the example processor platform 800 discussed below in connection with FIG. 8. The program(s) may be embodied in software stored on a non-transitory computer readable storage medium such as a CD-ROM, a floppy disk, a hard drive, a DVD, a Blu-ray disk, or a memory associated with the processor 812, but the entireties of the program(s) and/or parts thereof could alternatively be executed by a device other than the processor 812 and/or embodied in firmware or dedicated hardware. Further, although the example program(s) is/are described with reference to the flowcharts illustrated in FIGS. 4-7, many other methods of implementing the example population reach determiner 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 4-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 4:
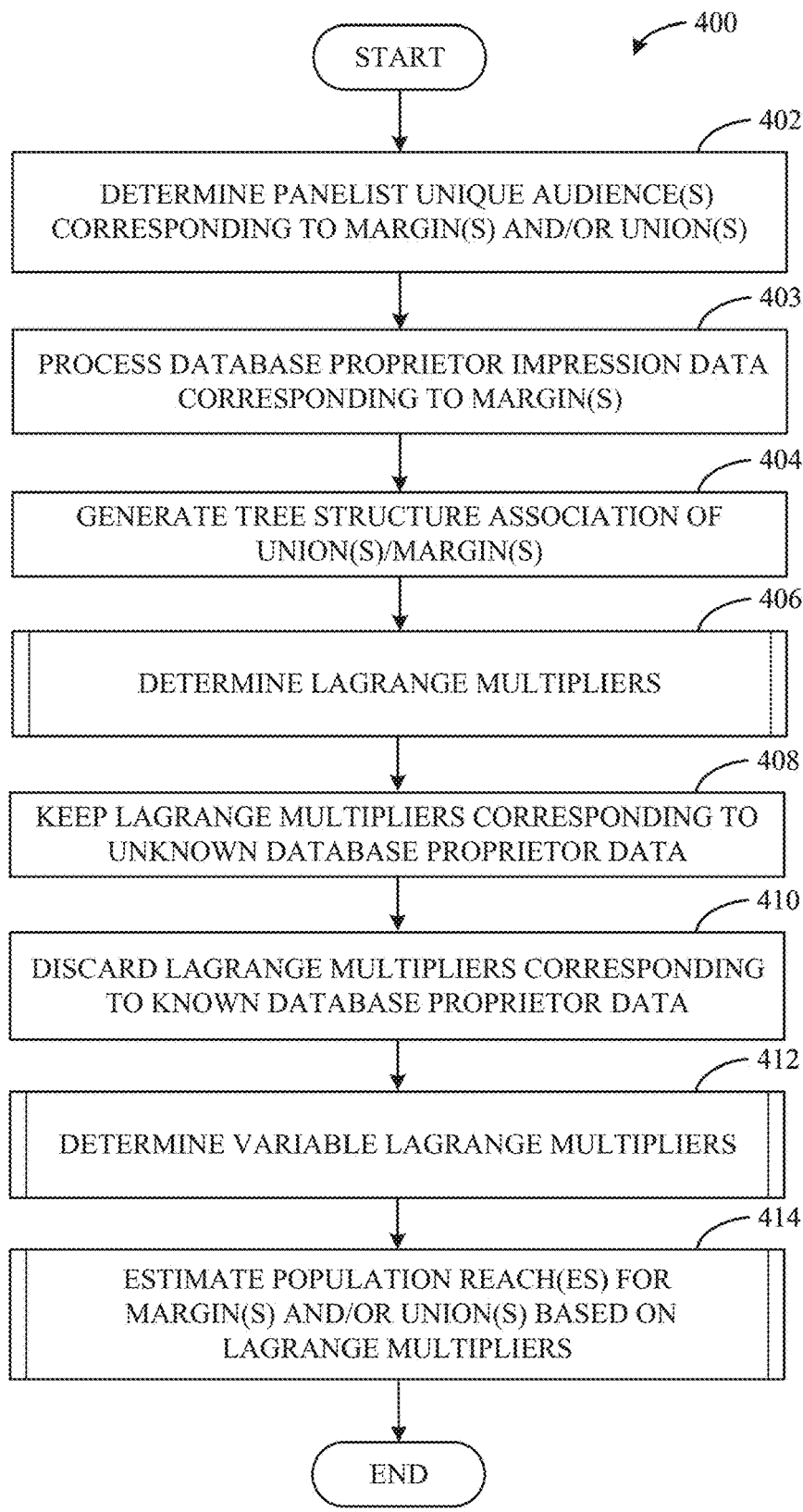
FIGS. 4-7 are flowcharts illustrating example machine readable instructions that may be executed to implement the example audience population determiner of FIGS. 1 and/or 3.

FIG. 4 is an example flowchart 400 representative of example machine readable instructions that may be executed by the example audience population determiner 114 of FIGS. 1 and/or 3 to generate respective population reach estimate(s) for various margins and/or unions. The example flowchart 400 is described in conjunction with the example marginal and union data 200 of FIG. 2. However, the example flowchart 400 may be implemented in conjunction with any panelist data, database proprietor data, margins, and/or unions.

At block 402, the example association controller 304 (FIG. 3) determines panelist unique audience(s) corresponding to margin(s) and/or union(s) of the media 100 of FIG. 1. For example, the association controller 304 accesses the panelist impression storage 301 of FIG. 3 to obtain impression data corresponding to particular marginals and/or union data based on predefined margins and/or unions (e.g., the predefined margins and/or unions based on user and/or manufacturer preferences). Using the example of FIG. 2A, the interface(s) 300 obtains panelist impression data from the panelist impression storage 301 corresponding to particular media (e.g., a television show) at margins A, B, C, and D. The association controller 304 processes the panelist impression data to determine the unique audience of the margins (e.g., A, B, C, and D) and/or unions (e.g., AB, CD, and ABCD). Additionally, the example data converter 302 (FIG. 3) may convert the unique panelist audience total and/or panelist impression total into a percentage by normalizing the totals to be 100%. For example, the data converter 302 may divide the panelist audience totals for the margins and/or unions by the total number of panelists in the panel and/or dividing the panelist impression totals by the total number of panelists in the panel. In some examples, when the panelist audience totals have been weighted by some pre-determined weight to match census proportions, the data converter 302 may divide the panelist audience totals for the margins and/or unions by the universe estimate.

At block 403, the example data converter 302 processes the database proprietor impression data corresponding to the margins of the media. For example, the data converter 302 obtains the database proprietor impression data from the database proprietor 110 via the example interface(s) 300 of FIG. 3. As described above in conjunction with FIG. 3, the data converter 302 process the database proprietor impression data by converting the database proprietor impression count(s) of the margins into a normalized impression percentage(s) (e.g., by dividing the counts by total number of panelists). At block 404, the example association controller 304 generates a tree structure association of the unions/margins. As described above in conjunction with FIG. 3, the example association controller 304 generates a tree structure association by tagging the margins and unions with numbers and/or identifiers and tagging each node with corresponding ancestor and/or descendant information. The tree structure association information is stored in the example local memory 306.

At block 406, the example commercial solver(s) 308 (FIG. 3) determine(s) Lagrange multipliers based on panelist data. For example, the commercial solver(s) 308 solve(s) for the Lagrange multipliers using Equations 6-8 (e.g., where AUD(A)=0.1, AUD(B)=0.2, AUD(C)=0.3, AUD(D)=0.4, AUD(AB)=0.25, AUD(CD)=0.55, AUD(ABCD)=0.7, IMP(A)=0.2, IMP(B)=0.3, IMP(A)=0.4, and IMP(A)=0.5) based on the panelist data and tree structure association data stored in the local memory 306 (FIG. 3). An example process that may be used to implement block 406 is described below in conjunction with FIG. 5. For example, using Equation 8 the commercial solver(s) 308 determine(s) that $y_1=1$, $y_2=0.5$, $y_3=0.333$, and $y_4=0.25$. Because $y_i=e^{\delta_i}$, the commercial solver(s) 308 determine(s) that $\delta_1=0$, $\delta_2=-0.6931$, $\delta_3=-1.0986$, and $\delta_4=-1.3863$. Additionally, the commercial solver(s) 308 determine(s), based on the determined y values that satisfy the system of equations represented by Equations 6-8, $\lambda_0=-2.1438$, $\lambda_1=-1.0986$, $\lambda_2=0.6931$, $\lambda_3=0.5878$, $\lambda_4=1.3863$, $\lambda_5=-2.0149$, $\lambda_6=-1.1939$, and $\lambda_7=0.8109$, where $\lambda_0$ corresponds to the normalized constraint, $\lambda_1$ corresponds to the margin A (e.g., corresponding to node 1), $\lambda_2$ corresponds to the margin B (e.g., corresponding to node 2), . . . , and $\lambda_7$ corresponds to the union ABCD (e.g., corresponding to node 7). Because $z_i=e^{\lambda_i}$, the commercial solver(s) 308 determine(s) that $z_0=32$ 0.3, $z_1=0.333$, $z_2=2$, $z_3=1.8$, $z_4=4$, $z_5=0.133$, $z_6=0.303$, $z_7=2.25$.

At block 408, the example commercial solver(s) 308 keep(s) values of the Lagrange multipliers corresponding to the unknown database proprietor data (.g., in the example of FIG. 2A, panelist audience size(s) (e.g., $\lambda_1=-1.0986$, $\lambda_2=0.6931$, $\lambda_3=0.5878$, $\lambda_4=1.3863$, $\lambda_5=-2.0149$, $\lambda_6=-1.1939$, and $\lambda_7=0.8109$)). At block 410, the example commercial solver(s) 308 discard(s) the Lagrange multipliers corresponding to known database proprietor data. Using the example of FIG. 2A, the commercial solver(s) 308 discard(s) impression counts (e.g., impression-based Lagrange multipliers δs) and the Lagrange multiplier corresponding to the size of the panelist audience not exposed to the media (e.g., $\lambda_0$), thereby designating the Lagrange multiplier variables δs and $\lambda_0$ and $z_0$ (e.g., $z_0=e^{\lambda_0}$ as empty, overwritable/replaceable, or ready to be determined at a subsequent time.

At block 412, the example commercial solver(s) 308 determine(s) the variable Lagrange multipliers based on the panelist data and database proprietor data. For example, the commercial solver(s) 308 determine(s) the variable Lagrange multipliers (e.g., impression-based Lagrange multipliers δs) and the value corresponding to the size of the size of the panelist audience not exposed to the media (e.g., $z_0$ and/or $\lambda_0$) using the system of equations corresponding to Equations 6-8 based on the kept Lagrange multipliers (e.g., $\lambda_1=-1.0986$, $\lambda_2=0.6931$, $\lambda_3=0.5878$, $\lambda_4=1.3863$, $\lambda_5=-2.0149$, $\lambda_6=-1.1939$, and $\lambda_7=0.8109$) and the population impression totals of the margins (e.g., IMP(A)=0.4, IMP(B)= 0.6, IMP(C)=0.8, IMP(D)=1), thereby resulting in $\hat{\delta}$s and $z_0$, as further described below in conjunction with FIG. 6. For example, using the example data of FIG. 2A, the commercial solver(s) 308 determine(s) that $\hat{\delta}_1=0.4314$, $\hat{\delta}_2=-0.0380$, $\hat{\delta}_3=-0.4038$, $\hat{\delta}_4=-0.4995$, and $z_0=0.1172$ (e.g., $\hat{\lambda}_0=2.1438$ per the system of equations and $z_0=e^{\lambda_0}$). At block 414, the example commercial solver(s) 308 estimate(s) the population reach(es) for one or more of the margins (e.g., A, B, C, and/or D) and/or unions (e.g., AB, CD, and/or ABCD) based on the Lagrange multipliers (e.g., the $\lambda_0$ and the $\hat{\delta}$s) determined at blocks 406 and 412 using the above Equation 6, as further described below in conjunction with FIG. 7. As a result of block 414, the example commercial solver(s) 308 determine(s) that the population reach for the A margin is 128, the population reach of the B margin is 306, the population reach of the C margin is 480, the population reach of the B margin is 622, the population reach of the AB union is 360, the population reach of the CD union is 762, and the population reach of the ABCD union is 883.

Figure 5:
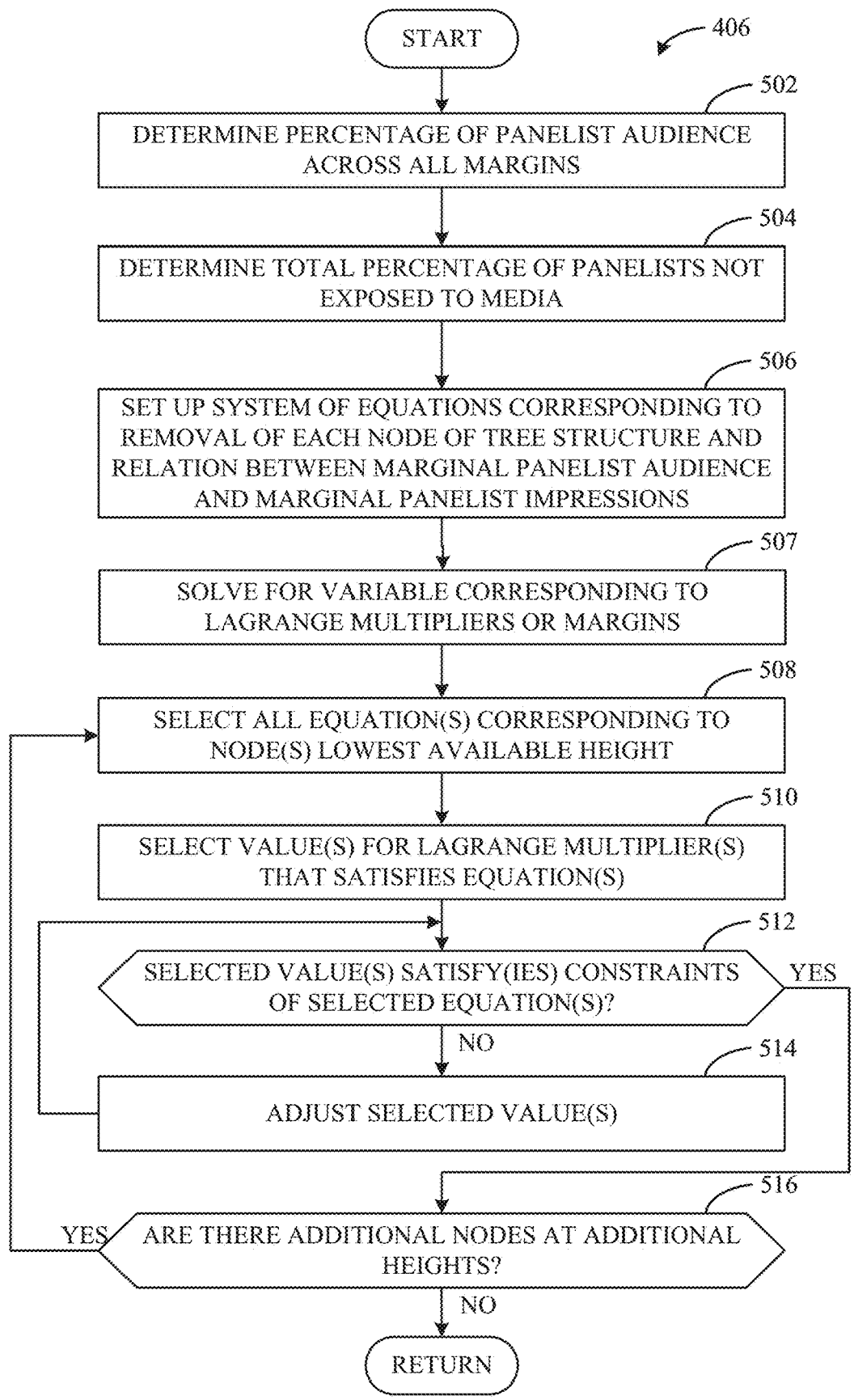

FIG. 5 is an example flowchart 406 representative of example machine readable instructions that may be executed by the example audience population determiner 114 of FIGS. 1 and/or 3 to solve for the Lagrange multipliers using Equations 6-8 (e.g., where AUD(A)=0.1, AUD(B)=0.2, AUD(C)=0.3, AUD(D)=0.4, AUD(AB)=0.25, AUD(CD)=0.55, AUD(ABCD)=0.7, IMP(A)=0.2, IMP(B)=0.3, IMP(A)= 0.4, and IMP(A)=0.5) based on the panelist data and tree structure association data stored in the local memory 306. The instructions of FIG. 5 may be used to implement block 406 of FIG. 4. The example flowchart 406 is described in conjunction with the example marginal and union data 200 of FIG. 2A. However, the example flowchart 406 may be implemented in conjunction with any panelist data, database proprietor data, margins, and/or unions.

At block 502, the example commercial solver(s) 308 determine(s) the panelist audience size percentage across all margins (e.g., AUD(T) of Equation 6). Using the example of FIG. 2, the commercial solver(s) 308 determine(s) that the panelist audience size across all margins corresponds to 0.7 (e.g., the percentage corresponding to the union ABCD). At block 504, the example commercial solver(s) 308 determine(s) the total percentage of panelists not exposed to media (e.g., $z_0$ of Equation 7). For example, the commercial solver(s) 308 determine(s) that the total percentage of panelists not exposed to media is 0.3 (e.g., $z_0+0.7=1.0$, from Equation 7). Accordingly, the commercial solver(s) 308 determine(s) that $\lambda_0=-1.20397$, because $z_i=e^{\lambda_i}$.

At block 506, the example commercial solver(s) 308 set(s) up a system of equations based on Equation 6 corresponding to removal off each node of the tree structure association using the panelist data and for the relations between marginal panelist audience size and marginal panelist impression counts (e.g., corresponding to Equation 8). For example, the commercial solver(s) 308 set(s) up a system of equations including 0.7−AUD(T\1)=0.1 for node 1 (e.g., margin A), 0.7−AUD(T\2)=0.2 for node 2 (e.g., margin B), . . . , 0.7−AUD(T\6)=0.55 for node 6 (e.g., union CD), IMP(1)=(1+$y_1$)(AUD(1)), . . . , IMP(4)=(1+$y_4$)(AUD(4)). At block 507, the example commercial solver(s) 380 solve for the variables (e.g., ys) corresponding to the Lagrange multipliers of the margins (e.g., impression-based Lagrange multipliers δs) using Equation 8. For example, the commercial solver(s) 380 determine that based on the above Equations corresponding to Equation 8, $y_1=1$, $y_2=0.5$, $y_1=0.333$, and $y_1=0.25$. Thus, $\delta_1=0$, $\delta_2=-0.6931$, $\delta_3=-1.0986$, and $\delta_4=-1.3863$.

At block 508, the example commercial solver(s) 308 select(s) all equations corresponding to node(s) at the lowest available height (e.g., margins being the lowest height and the union corresponding to the total representing the highest height). As described above, because removing a node from the tree structure association only affects the ancestors of the node, the commercial solver(s) 308 perform(s) parallel computations with a processor to calculate the Lagrange multipliers at the same height in parallel without affecting the other nodes. For example, initially the commercial solver(s) select(s) the equations corresponding to the lowest level nodes (e.g., 1, 2, 3, and 4) corresponding to the margins A, B, C, and D (e.g., 0.7−AUD(T\1)=0.1, 0.7−AUD(T\2)=0.2, 0.7−AUD(T\3)=0.3, and 0.7−AUD(T\4)=0.3).

At block 510, the example commercial solver(s) 308 select(s) value(s) for the Lagrange multiplier(s) that satisfy(ies) the equations. As described above, each of the selected equations corresponds to Equation 4, which include variable(s) that can be identified using Equation 5. Because both Equation 4 and Equation 5 include z values and $z_i=e^{\lambda_i}$, the commercial solver(s) 308 can select a value for the Lagrange multipliers ($\lambda$i) that satisfies the selected equation(s). The example commercial solver(s) 308 determine(s) if the selected value(s) satisfy(ies) the constraint(s) of the selected equation(s) (e.g., within a threshold amount of error) (block 512).

If the example commercial solver(s) 308 determine(s) that the selected value(s) do(es) not satisfy(ies) the constraint(s) of the selected equation(s) (block 512: NO), the commercial solver(s) 308 adjust(s) the selected value(s) of the Lagrange multipliers (block 514) and control returns to block 512 until the selected value(s) do(es) satisfy the constraints (e.g., within the threshold amount of error). In this manner, the example commercial solver(s) 308 perform(s) parallel computations with a processor to determine the Lagrange multipliers in an iterative fashion in parallel. If the example commercial solver(s) 308 determine(s) that the selected value(s) do(es) satisfy the constraint(s) of the selected equation(s) (block 512: YES), the example commercial solver(s) 308 determine(s) if there are additional node(s) of the tree structure association at additional height(s) (block 516). For example, once the example commercial solver(s) 308 determine(s) the Lagrange multipliers for the margins A, B, C, and D, the commercial solver(s) 308 determine(s) that there are additional nodes (e.g., AB and CD) at the next lowest height. If the commercial solver(s) 308 determine(s) that there are additional node(s) at additional height(s) (block 516: YES), control returns to block 508 to determine the Lagrange multipliers corresponding to the additional node(s). If the commercial solver(s) 308 determine(s) that there are not additional node(s) at additional height(s) (block 516: NO), the example process of FIG. 5 ends, and control returns to a calling function or process such as the example process of FIG. 4.

Figure 6:
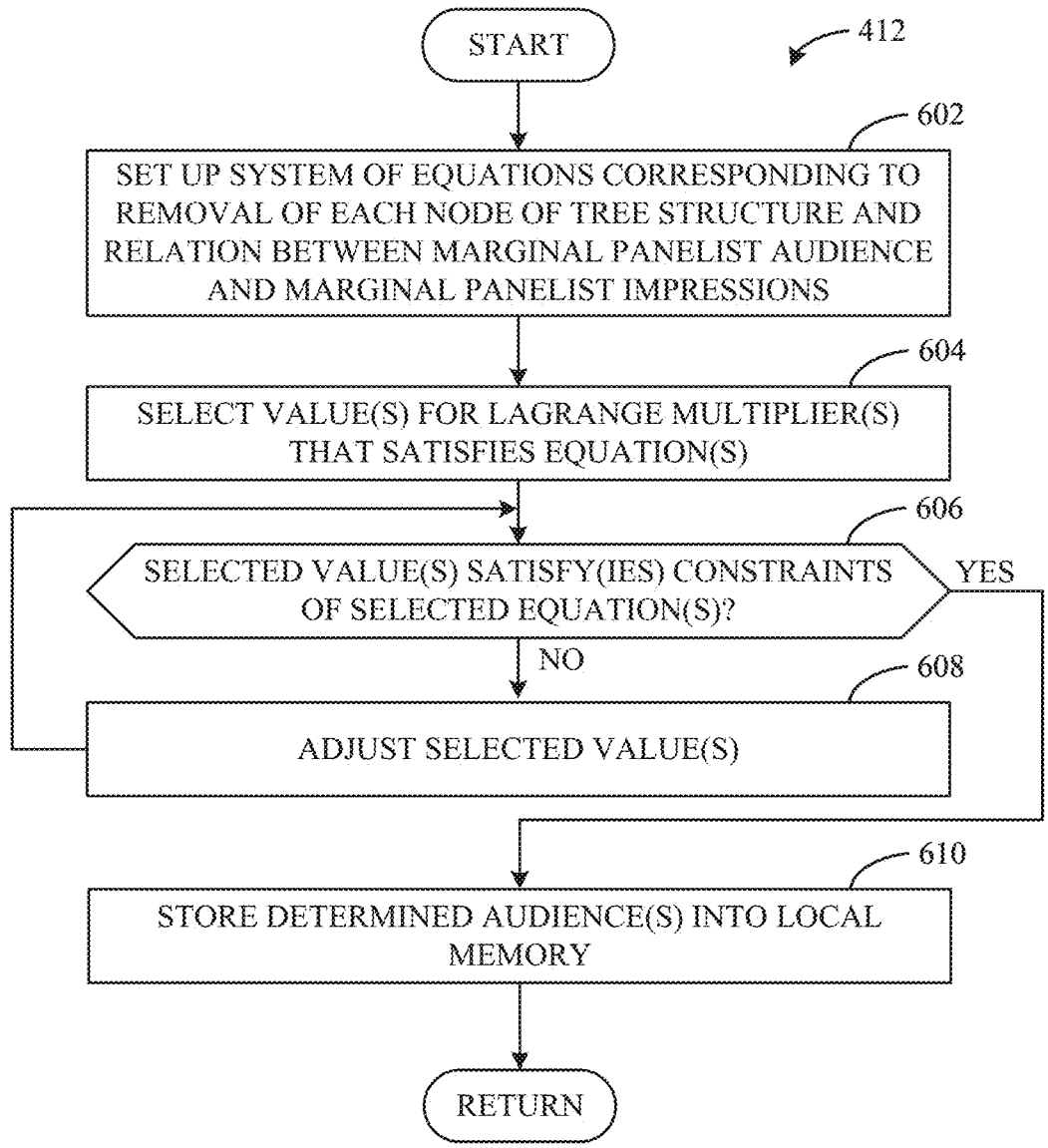

FIG. 6 is an example flowchart 412 representative of example machine readable instructions that may be executed by the example audience population determiner 114 of FIGS. 1 and/or 3 to solve for the variable Lagrange multipliers (e.g., impression-based Lagrange multipliers δs) and the value corresponding to the panelist audience size not exposed to the media (e.g., $z_0$ and/or $\lambda_0$) using the system of equations corresponding to Equations 6-8 based on the kept Lagrange multipliers (e.g., $\lambda_1=-1.0986$, $\lambda_2=0.6931$, $\lambda_3=0.5878$, $\lambda_4=1.3863$, $\lambda_5=-2.0149$, $\lambda_6=-1.1939$, and $\lambda_7=0.8109$) and the population impression totals of the margins (e.g., IMP(A)=0.4, IMP(B)=0.6, IMP(C)=0.8, IMP(D)=1). The example instructions of FIG. 6 may be used to implement block 412 of FIG. 4. The example flowchart 412 is described in conjunction with the example marginal and union data 200 of FIG. 2A. However, the example flowchart 412 may be implemented in conjunction with any panelist data, database proprietor data, margins, and/or unions.

At block 602, the example commercial solver(s) 308 set(s) up a system of equations based on Equations 6-8 corresponding to removal of each node of the tree structure association. For example, the commercial solver(s) 308 use(s) the panelist data where the first subset Lagrange multipliers are used for the equations corresponding to union removals and the relation between marginal panelist audience size and marginal panelist impression counts (e.g., Equation 8). For example, the commercial solver(s) 308 set(s) up a system of equations including IMP(1)=$(1+y_1)$(AUD(1)), where AUD(1)=AUD(T)−AUD(T\1), IMP(1)=0.4, and AUD(T)=$z_0 z_7 s_7$ for the first node 1 (e.g., corresponding to margin A), IMP(2)=$(1+y_2)$(AUD(2)), where AUD(2)=AUD(T)−AUD(T\2), IMP(1)=0.6, and AUD(T)=$z_0 z_7 s_7$ for the first node 2 (e.g., corresponding to margin B), etc.

At block 604, the example commercial solver(s) 308 select(s) value(s) for the variable Lagrange multiplier(s) (e.g., Lagrange multipliers $\lambda_0$ and δs) that satisfy the equations while using the first subset Lagrange multiplier(s) (e.g., $\lambda_1=-1.0986$, $\lambda_2=0.6931$, $\lambda_3=0.5878$, $\lambda_4=1.3863$, $\lambda_5=-2.0149$, $\lambda_6=-1.1939$, and $\lambda_7=0.8109$). As described above, each of the selected equations corresponds to Equations 2 and 4, which includes a variable s and a variable $s^{(new)}$ that can be identified using Equations 3 and 5, respectively. Because Equations 2-5 and 7 may include the $z_0$ value and $z_0=e^{\lambda_0}$, the commercial solver(s) 308 can select a value for the variable Lagrange multiplier ($\lambda_0$) that satisfies the selected equation(s). Additionally, because Equations 2-5 includes values that correspond to the y values $y_0=e^{\lambda_0}$, the commercial solver(s) 308 can select a value for the Lagrange multipliers (impression-based Lagrange multipliers δs) that satisfies the selected equation(s). Once the commercial solver(s) 308 select(s) the value(s) of the variable Lagrange multipliers, the example commercial solver(s) 308 determine(s) if the selected value(s) satisfy(ies) the constraint(s) of the selected equation(s) (e.g., within a threshold amount of error) (block 606).

If the example commercial solver(s) 308 determine(s) that the selected value(s) do(es) not satisfy(ies) the constraint(s) of the selected equation(s) (block 606: NO), the commercial solver(s) 308 adjust(s) the selected value(s) of the variable Lagrange multipliers (block 608), and control returns to block 606 until the selected value(s) do(es) satisfy the constraints (e.g., within the threshold amount of error). In this manner, the example commercial solver(s) 308 perform(s) parallel computations with a processor to determine(s) the variable Lagrange multipliers in an iterative fashion in parallel. If the example commercial solver(s) 308 determine(s) that the selected value(s) do(es) satisfy the constraint(s) of the selected equation(s) (block 606: YES), the commercial solver(s) 310 store the determined audiences (e.g., AUD(1), AUD(2), etc.) based on the selected values when the selected value(s) satisfy the during this step in the example local memory 306 (block 610). In this manner, the flowchart of FIG. 7 can determine the reach(es) of the margins and/or unions with less computations, as further described below. After block 610, the example process of FIG. 6 ends, and control returns to a calling function or process such as the example process of FIG. 4.

Figure 7:
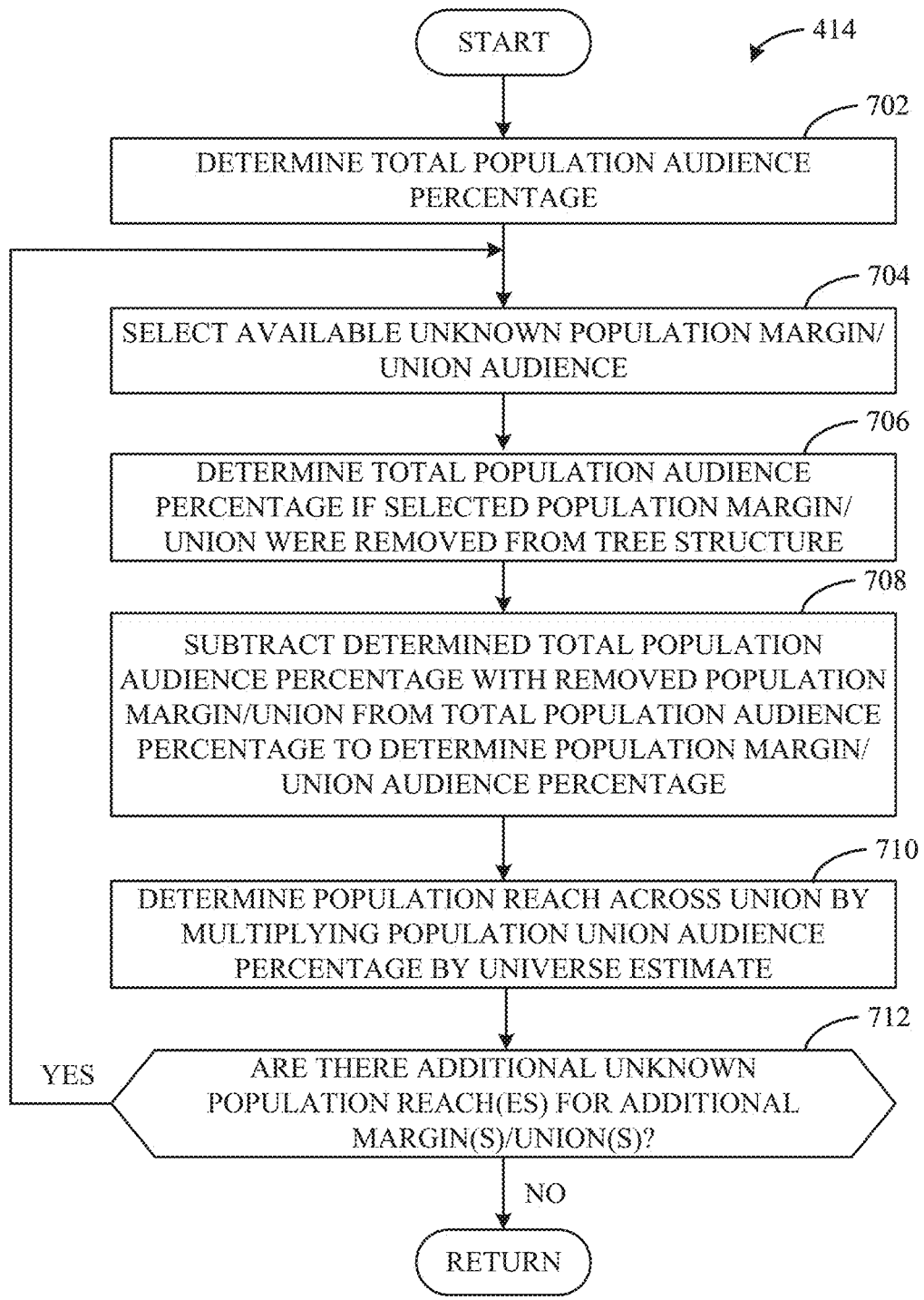

FIG. 7 is an example flowchart 414 representative of example machine readable instructions that may be executed by the example audience population determiner 114 of FIGS. 1 and/or 3 to estimate the population reach(es) for one or more of the margins (e.g., A, B, C, and/or D) and/or unions (e.g., AB, CD, and/or ABCD) based on the Lagrange multipliers (e.g., the $\lambda_0$ and the δˆs) determined at blocks 406 and 412 using the above Equation 6. The example instructions of FIG. 7 may be used to implement block 414 of FIG. 4. The instructions of the example flowchart 414 are described in conjunction with the example marginal and union data 200 of FIG. 2A. However, the example flowchart 414 may be implemented in conjunction with any panelist data, database proprietor data, margins, and/or unions.

At block 702, the example commercial solver(s) 308 determine(s) the total population audience percentage (e.g., AUD(T)). As described above in conjunction with Equation 2, AUD(T)=$z_0 z_N s_N$, where $z_N$ corresponds to the Lagrange multiplier solved at block 406 of FIG. 4, $z_0$ correspond to the Lagrange multipliers determined at block 412 of FIG. 4, and $s_N$ can be solved using Equation 3. Accordingly, the commercial solver(s) 308, using Equation 2, determine(s) that since N=7, $s_1=y_1=1.5394$ $s_2=y_2=0.9627$ $s_3=y_3=0.6678$ $s_4=y_4=0.6068$, $s_5=(1+s_1\hat{z}_1)(1+s_2\hat{z}_2)-1=3.4266$, and $s_6=(1+s_3\hat{z}_3)(1+s_3\hat{z}_3)-1=6.5472$. Accordingly, the example commercial solver(s) 308 determine(s) that $s_7=(1+s_5\hat{z}_5)(1+s_6\hat{z}_6)-1=3.3473$. Thus, the example commercial solver(s) 308 determine(s) that AUD(T)=(0.1172)(2.25)(3.3473)=0.8828.

At block 704, the example commercial solver(s) 308 select(s) an available unknown population margin and/or union audience. For example, in the example of FIG. 2, percentages corresponding to the margins A, B, C, and D, and the unions AB, CD, and ABCD are unknown for the database proprietor impression data. For example, the example commercial solver(s) 308 may select the AB (e.g., corresponding to node 5 of the example tree structure 202 of FIG. 2). At block 706, the example commercial solver(s) 308 determine(s) the total population audience percentage if the selected population union were removed from the tree structure association (e.g., AUD(T\5)). For example, using the above Equation 4, the example commercial solver(s) 308 determine(s) that AUD(T\5)=$z_0 z_7 s_7^{(new)}$. Because the z values are known (e.g., based on the Lagrange multipliers from blocks 406 and 414), to solve for AUD(T/5), the commercial solver(s) 308 utilize(s) Equation 5 to solve for $s_7^{(new)}$. For example, based on the tree structure association and Equation 5, $$s_7^{(new)} = \left(\frac{s_7+1}{1+s_5 z_5}\right)-1.$$

Accordingly, the example commercial solver(s) 308 determine(s) that the $$s_7^{(new)} = \left(\frac{(3.3473)+1}{1+(3.4266)(0.1333)}\right) - 1 = 1.984.$$

Thus, the commercial solver(s) 308 determine(s) that AUD (T\5)=(0.1172)(2.25)(1.984)=0.5232.

At block 708, the example commercial solver(s) 308 subtract(s) the determined total population audience with the removed population union from the total population audience to determine the population union audience percentage (e.g., corresponding to Equation 1). For example, the commercial solver(s) 308 determine(s) the total deduplicated population audience percentage of union AB to be 0.3595 (e.g., 0.3595=0.8828−0.5232). At block 710, the example commercial solver(s) 308 determine(s) the population reach across the selected union by multiplying the population union audience percentage by the universe estimate based on what is being measured (e.g., Males with Internet access, people in Boston, etc.). The universe estimate is stored at the AME. For example, if the universe estimate is 1,000 people, then the example commercial solver(s) 308 determine(s) the population reach for union AB to be roughly 360 people. At block 712, the example commercial solver(s) 308 determine(s) if there are additional unknown population union audiences to solve for. If the example commercial solvers) 308 determine that there are additional population reach(es) for additional union(s) to solve for (block 712: YES), control returns to block 704 to determine an additional population reach for an additional margin and/or union. If the example commercial solvers) 308 determine(s) that there are not additional population reach(es) for additional union(s) to solve for (block 712: NO), the example process of FIG. 7 ends, and control returns to a calling function or process such as the example process of FIG. 4.

Figure 8:
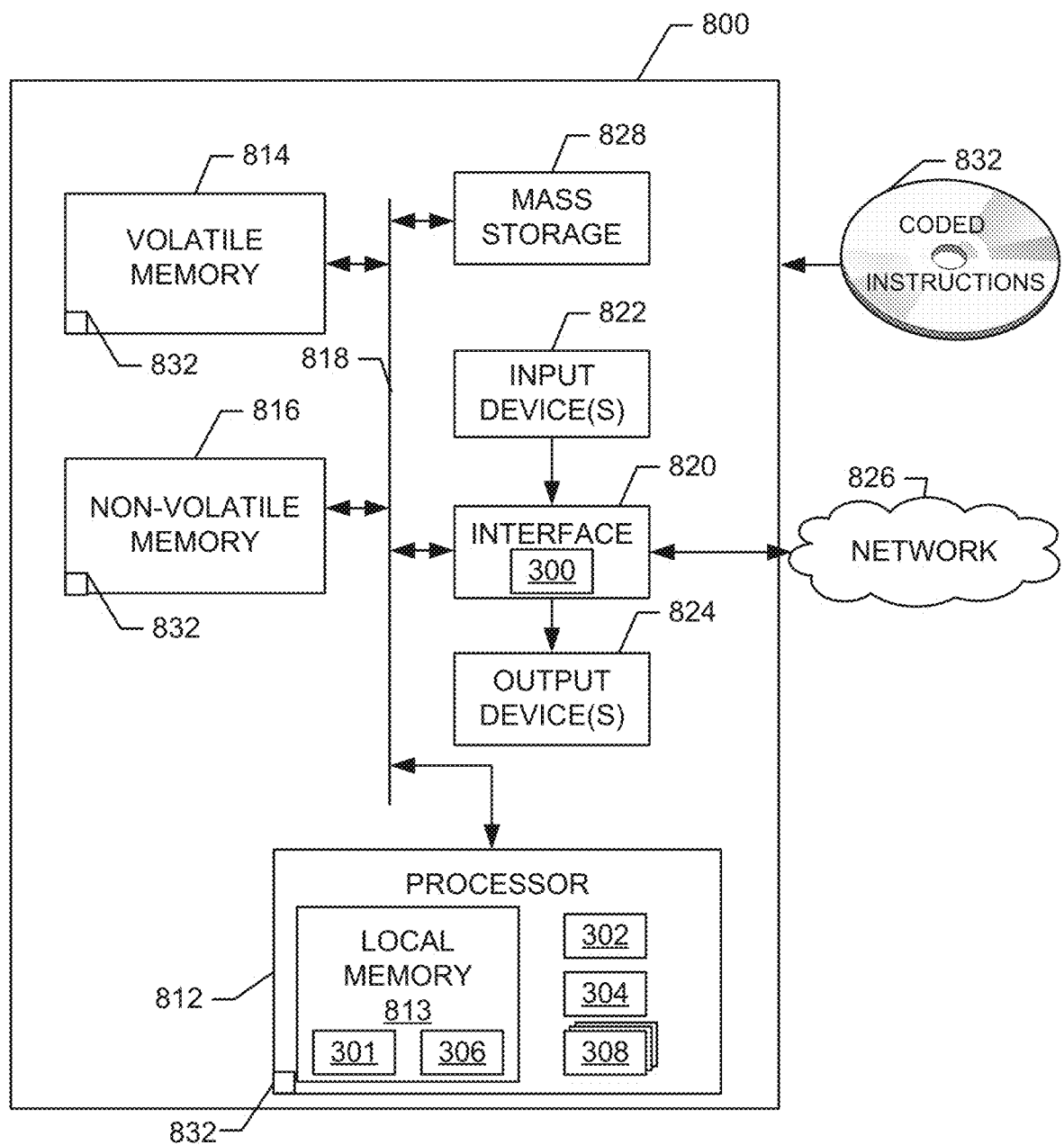
FIG. 8 is a block diagram of an example processing system structured to execute the example machine readable instructions of FIGS. 4-7 to implement the example audience population determiner of FIGS. 1 and/or 3.

FIG. 8 is a block diagram of an example processor platform 800 structured to execute the instructions of FIGS. 4-7 to implement the population reach determiner 120 of FIG. 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 812 implements the example data converter 302, the example association controller 304, and the example commercial solver(s) 308 of FIG. 3.

The processor 812 of the illustrated example includes a local memory 813 (e.g., a cache). In FIG. 8, the example local memory 813 implements the example local memory 306 and/or the example panelist impression storage 301. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface. In the example of FIG. 8, the interface 820 implements the example interface(s) 300.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

Machine executable instructions 832 represented by FIGS. 4-7 may be stored in the mass storage device 828, in the volatile memory 814, in the non-volatile memory 816, and/or on a removable non-transitory computer readable storage medium such as a CD or DVD.

From the foregoing, it should be appreciated that the above disclosed methods, apparatus, and articles of manufacture estimate population reach from marginal ratings. Examples disclosed herein determine the reach analytically using the above Equations 1-9. Traditional techniques for determining reach across various unions include determining the reach numerically. However, such traditional techniques are unsolvable for a large number of marginals dues to memory and/or processing constraints. Examples disclosed herein alleviate the problems associated with such traditional techniques by demining the reach analytically (e.g., via solving the disclosed Equations 2-9 using a population reach union estimates) in a manner that facilitates parallel processing. The parallel processing results in a faster more efficient calculation. In this manner, the estimations of reach can be determined in a faster, more efficient manner that requires less memory than traditional numerical techniques. Using examples disclosed herein, reach can be determined from a nearly infinite number of instances and/or unions of media exposure based on the marginal media exposure data.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus to estimate a population reach of media, the apparatus comprising:
    interface circuitry to obtain at least one of (a) a panelist impression count corresponding to a plurality of devices or (b) a database proprietor impression count from a database proprietor via network communications;
    memory to store the panelist impression count and the database proprietor impression count;
    computer readable instructions; and
    programmable circuitry to be programmed by the computer readable instructions to:
        access the panelist impression count from the memory;
        determine first multipliers corresponding to the panelist impression count and panelist audience size totals of at least one of a first margin of the media, a second margin of the media, or a union of the first margin and the second margin, the first margin, the second margin, and the union included in a tree association;
        concurrently determine second multipliers using the tree association and the first multipliers;
        determine third multipliers corresponding to a total audience size exposed to the media at at least one of the first margin, the second margin, or the union based on the tree association using database proprietor impression totals; and
        determine, based on the third multipliers, an estimate for the population reach of the media for at least one of the first margin, the second margin, or the union.

2. The apparatus of claim 1, wherein the interface circuitry is to output a report corresponding to the estimate for the population reach of the media.

3. The apparatus of claim 1, wherein the programmable circuitry is to generate the tree association by:
    tagging the first margin with a first identifier, the second margin with a second identifier, and a third margin with a third identifier; and
    tagging the first margin, the second margin, and the union with at least one of corresponding descendant node identifiers or corresponding ancestor node identifiers.

4. The apparatus of claim 1, wherein the programmable circuitry is to concurrently determine the second multipliers by concurrently solving a first equation corresponding to the first margin, a second equation corresponding to the second margin, and a third equation corresponding to the union.

5. The apparatus of claim 4, wherein the programmable circuitry is to solve for a third multiplier of the first equation and a fourth multiplier of the second equation in parallel.

6. The apparatus of claim 1, wherein the programmable circuitry is to determine the first multipliers iteratively.

7. The apparatus of claim 1, wherein the union is a first union, the tree association corresponding to a second union of third and fourth margins the total audience size of the media corresponding to a third union of the first and second unions.

8. The apparatus of claim 7, wherein the programmable circuitry is to determine the estimate of the population reach of the first union based on a difference between a first percentage of the total audience size and a second percentage of the total audience size if the first union is removed from the tree association.

9. The apparatus of claim 1, wherein the programmable circuitry is to discard the first multipliers prior to determining the third multipliers.

10. A non-transitory computer readable medium comprising instructions which, when executed, cause one or more processors to at least:
    obtain at least one of (a) a panelist impression count corresponding to a plurality of devices or (b) a database proprietor impression count from a database proprietor via network communications;
    determine first multipliers corresponding to the panelist impression count and panelist audience size totals of at least one of a first margin of media, a second margin of the media, or a union of the first margin and the second margin, the first margin, the second margin, and the union included in a tree association;
    concurrently determine second multipliers using the tree association and the first multipliers;
    determine third multipliers corresponding to a total audience size exposed to the media at at least one of the first margin, the second margin, or the union based on the tree association using database proprietor impression totals; and
    determine, based on the third multipliers, an estimate for a population reach of the media for at least one of the first margin, the second margin, or the union.

11. The computer readable medium of claim 10, wherein the instructions are to cause the one or more processors to output a report corresponding to the estimate for the population reach of the media.

12. The computer readable medium of claim 10, wherein the instructions are to cause the one or more processors to generate the tree association by:
    tagging the first margin with a first identifier, the second margin with a second identifier, and a third margin with a third identifier; and
    tagging the first margin, the second margin, and the union with at least one of corresponding descendant node identifiers or corresponding ancestor node identifiers.

13. The computer readable medium of claim 10, wherein the instructions are to cause the one or more processors to concurrently determine the second multipliers by concurrently solving a first equation corresponding to the first margin, a second equation corresponding to the second margin, and a third equation corresponding to the union.

14. The computer readable medium claim 13, wherein the instructions are to cause the one or more processors to solve for a third multiplier of the first equation and a fourth multiplier of the second equation in parallel.

15. The computer readable medium claim 10, wherein the instructions are to cause the one or more processors to determine the first multipliers iteratively.

16. The computer readable medium of claim 10, wherein the union is a first union, the tree association corresponding to a second union of third and fourth margins the total audience size of the media corresponding to a third union of the first and second unions.

17. The computer readable medium of claim 16, wherein the instructions are to cause the one or more processors to determine the estimate of the population reach of the first union based on a difference between a first percentage of the total audience size and a second percentage of the total audience size if the first union is removed from the tree association.

18. The computer readable medium of claim 10, wherein the instructions are to cause the one or more processors to discard the first multipliers prior to determining the third multipliers.

19. A method to estimate a population reach of media, the method comprising:
- obtaining at least one of (a) a panelist impression count corresponding to a plurality of devices or (b) a database proprietor impression count from a database proprietor via network communications;
- storing the panelist impression count and the database proprietor impression count in memory;
- accessing the panelist impression count from the memory;
- determining, by executing an instruction with one or more processors, first multipliers corresponding to the panelist impression count and panelist audience size totals of at least one of a first margin of the media, a second margin of the media, or a union of the first margin and the second margin, the first margin, the second margin, and the union included in a tree association;
- concurrently determining, by executing an instruction with the one or more processors, second multipliers using the tree association and the first multipliers;
- determining, by executing an instruction with the one or more processors, third multipliers corresponding to a total audience size exposed to the media at at least one of the first margin, the second margin, or the union based on the tree association using database proprietor impression totals; and
- determining, by executing an instruction with the one or more processors, an estimate for the population reach of the media for at least one of the first margin, the second margin, or the union based on the third multipliers.

20. The method of claim 19, further including outputting a report corresponding to the estimate for the population reach of the media.

\* \* \* \* \*